United States Patent
Kikuta et al.

(10) Patent No.: US 9,013,481 B2
(45) Date of Patent: Apr. 21, 2015

(54) METHOD AND DEVICE FOR FORMING SURFACE PROCESSING DATA

(75) Inventors: Mamoru Kikuta, Saitama (JP); Kenjiro Miura, Shizuoka (JP)

(73) Assignees: Calsonic Kansei Corporation, Saitama (JP); National University Corporation Shizuoka University, Shizuoka (JP)

( * ) Notice: Subject to any disclaimer, the term of this patent is extended or adjusted under 35 U.S.C. 154(b) by 352 days.

(21) Appl. No.: 13/583,638

(22) PCT Filed: Mar. 8, 2011

(86) PCT No.: PCT/JP2011/055301
§ 371 (c)(1),
(2), (4) Date: Sep. 9, 2012

(87) PCT Pub. No.: WO2011/111680
PCT Pub. Date: Sep. 15, 2011

(65) Prior Publication Data
US 2013/0002670 A1    Jan. 3, 2013

(30) Foreign Application Priority Data
Mar. 9, 2010  (JP) .................................. 2010-052123

(51) Int. Cl.
G06T 17/00  (2006.01)
G06T 17/20  (2006.01)
G06T 15/04  (2011.01)

(52) U.S. Cl.
CPC ................. *G06T 17/20* (2013.01); *G06T 15/04* (2013.01); *Y02T 10/82* (2013.01)

(58) Field of Classification Search
None
See application file for complete search history.

(56) References Cited

U.S. PATENT DOCUMENTS

| 5,744,081 A | 4/1998 | Tanigawa et al. |
| 7,283,140 B2 * | 10/2007 | Zhou et al. ..................... 345/582 |
| 7,327,365 B2 | 2/2008 | Chen et al. |

(Continued)

FOREIGN PATENT DOCUMENTS

| CN | 1741070 A | 3/2006 |
| CN | 101573730 A | 11/2009 |

(Continued)

OTHER PUBLICATIONS

Hiroaki Date et al.; "A Textured Shape Design System using Mesh Modeling"; IPSJ SIG Notes; May 20, 2005; vol. 2005, No. 44; pp. 55-60.

(Continued)

*Primary Examiner* — Phi Hoang
*Assistant Examiner* — Mohammad H Akhavannik
(74) *Attorney, Agent, or Firm* — Kenealy Vaidya LLP

(57) ABSTRACT

A polygon-meshed surface of a product is divided into regions, and a texture GA is mapped in an initial region A. The boundary line of an adjacent region B is multiplexed outward, and an overlapped region D is provided between the initial region and the adjacent region, and a region X to be processed is projected onto a two-dimensional plane and a texture GB is allocated. An optimal boundary line FS in which the difference between the pixel values of the textures GA and GB becomes minimal in the overlapped region is obtained, and the texture GB is mapped in the region X being processed so that the texture is connected to the texture GA at the optimal boundary line. The apexes of the polygon mesh displaced on the basis of the textures mapped in all the regions are connected to obtain grain-given polygon data.

21 Claims, 33 Drawing Sheets

(56) References Cited

U.S. PATENT DOCUMENTS

| | | |
|---|---|---|
| 7,733,350 B2 | 6/2010 | Lefebvre et al. |
| 2006/0028468 A1 | 2/2006 | Chen et al. |
| 2008/0001962 A1 | 1/2008 | Lefebvre et al. |
| 2008/0246766 A1 | 10/2008 | Yokohari et al. |
| 2012/0001908 A1* | 1/2012 | Kikuta et al. ............ 345/419 |

FOREIGN PATENT DOCUMENTS

| | | |
|---|---|---|
| JP | 7-241909 A | 9/1995 |
| JP | 9-6828 A | 1/1997 |
| JP | 2004-358662 A | 12/2004 |
| JP | 2008-257591 A | 10/2008 |

OTHER PUBLICATIONS

Alexei A. Efros et al.; "Image Quilting for Texture Synthesis and Transfer"; Proc. ACM SIGGRAPH 2001; Aug. 12, 2001; pp. 341-346.

Michael Ashikhmin; "Synthesizing Natural Textures"; Proc. 2001 Symp. Interactive 3D Graphics; Mar. 2001; pp. 217-226.

International Search Report for PCT/JP2011/055301 dated Jun. 14, 2011.

* cited by examiner

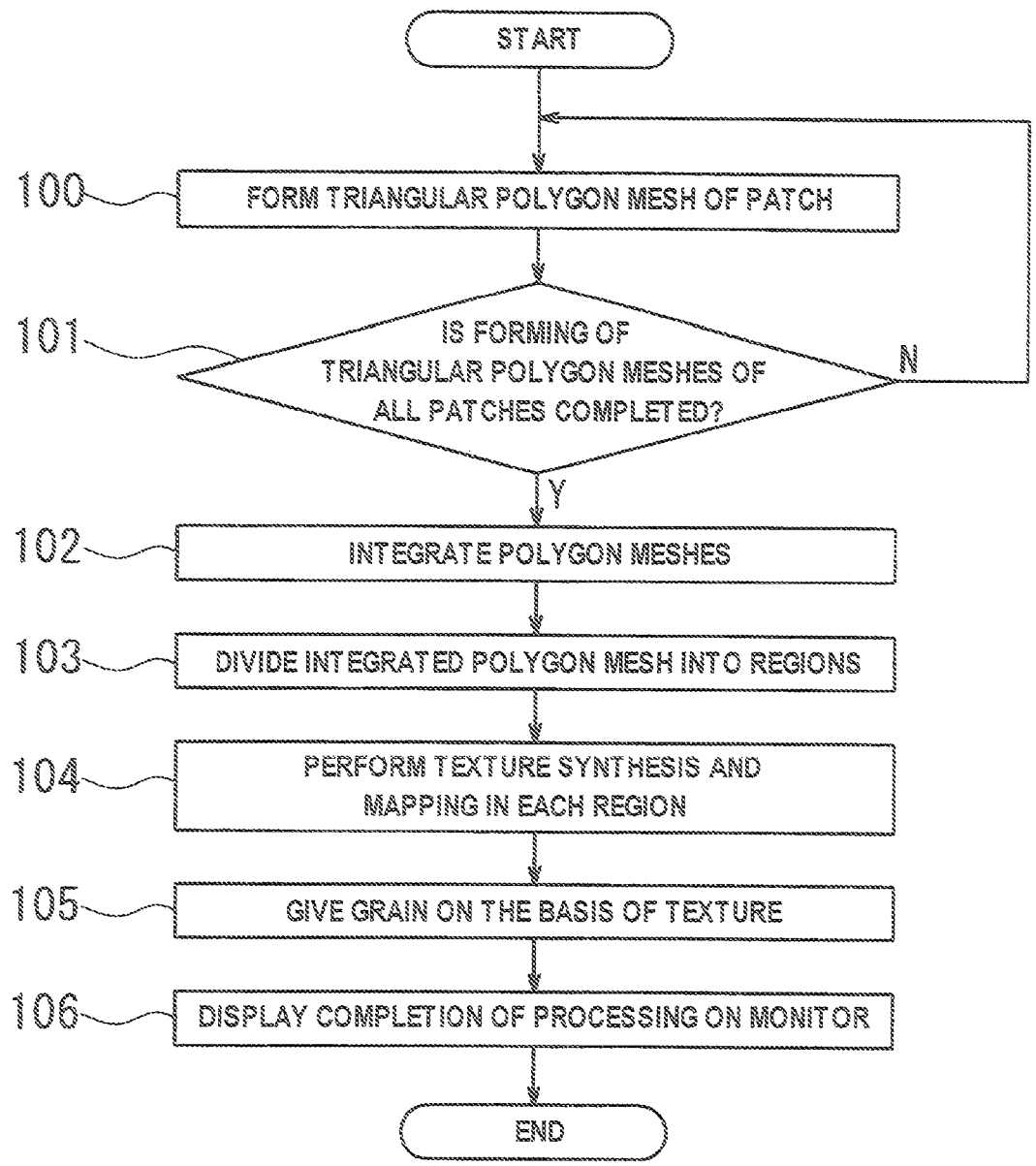

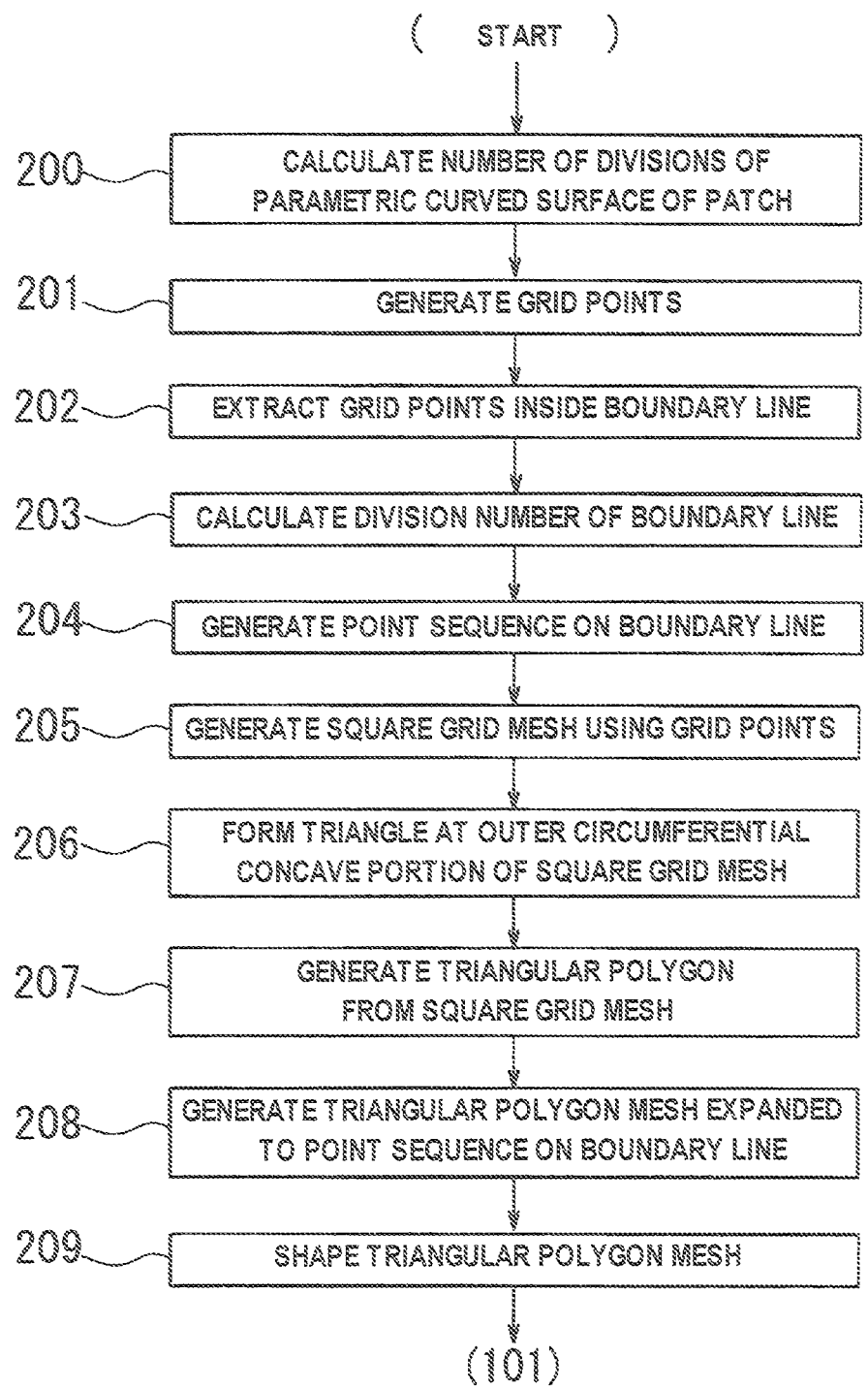

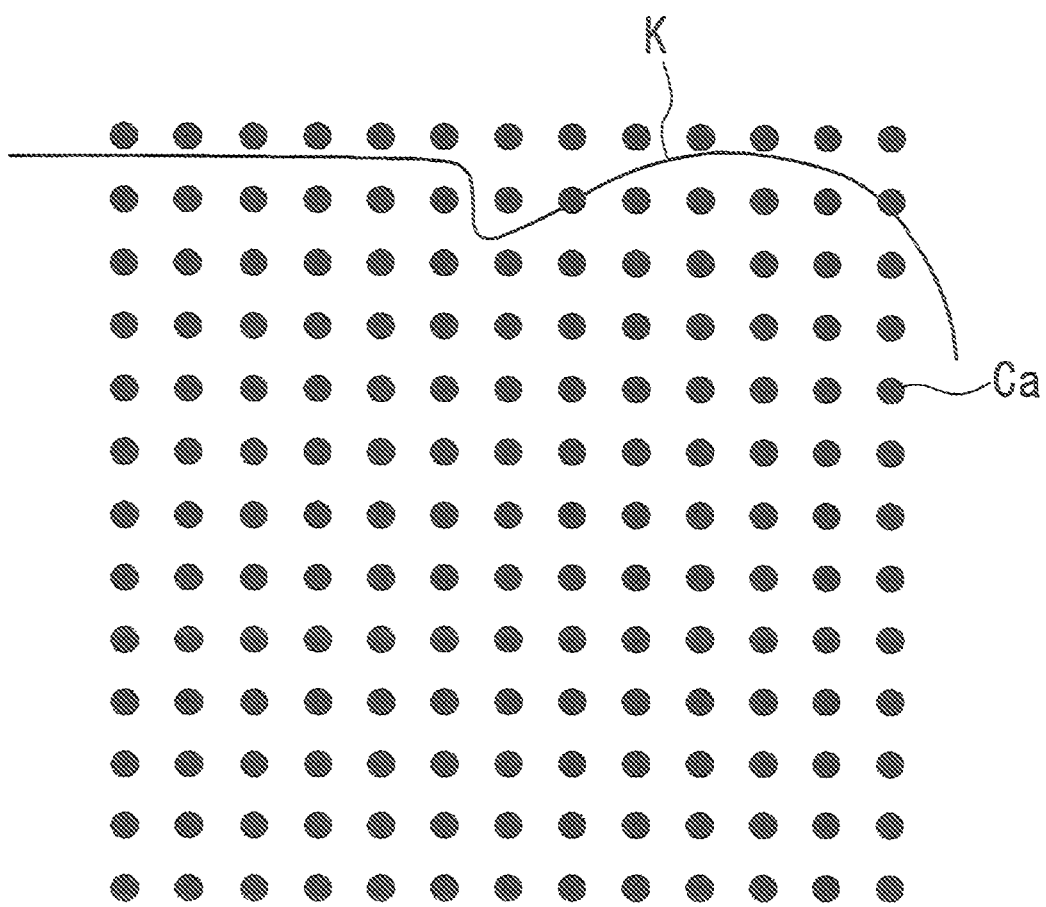

FIG. 16
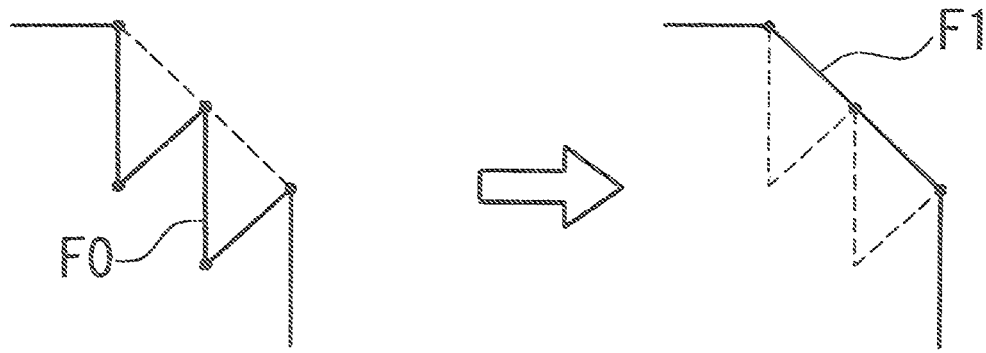
FIG. 17A
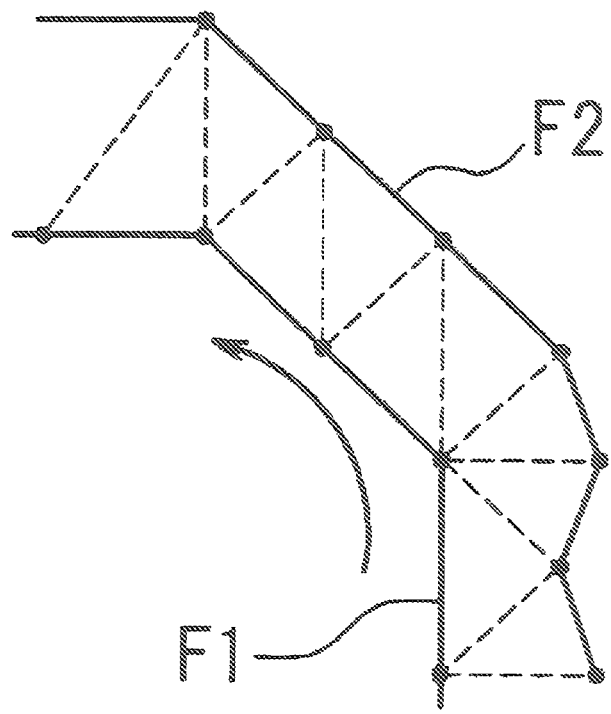
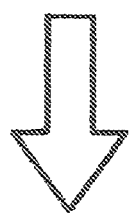

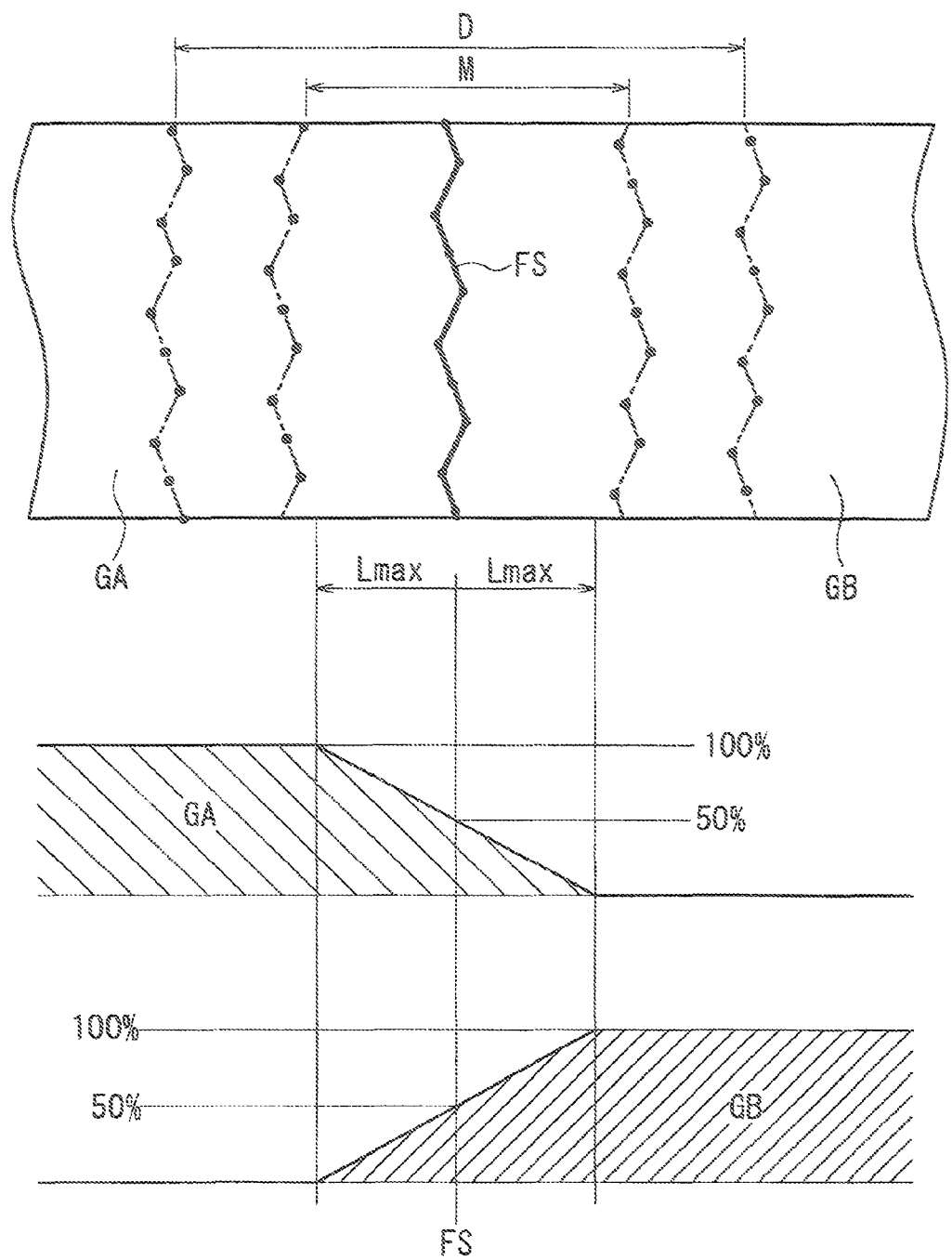

METHOD AND DEVICE FOR FORMING SURFACE PROCESSING DATA

This application is a U.S. national phase filing under 35 U.S.C. §371 of PCT Application No. PCT/JP2011/055301, filed Mar. 8, 2011, and claims priority under 35 U.S.C. §119 to Japanese patent application number JP2010-052123 filed on Mar. 9, 2010, the entireties of which are incorporated herein by reference.

TECHNICAL FIELD

The present invention relates to a method and a device for forming a grain pattern on the surface of a resin product.

BACKGROUND ART

On the surfaces of home electric appliances, stationery products or automotive interior products, grains are formed for various purposes, such as improvements in appearance and tactile sensation, glare proofing, and anti-skidding. Various fine patterns, such as leather-grain, wood-grain, rock-grain, sand-grain, pear-grain, and geometric patterns, are adopted as grain patterns. For the purpose of forming these grains on the surfaces of resin products, grain patterns are conventionally given on metal molds, for example, by an etching method or an electroforming method.

In the above-mentioned etching method, shapes are formed by corrosion; hence, the method is also applicable to metal molds for producing large products at low cost; however, the method is difficult to represent fine shapes and also difficult to form the same shape repeatedly.

Furthermore, in the case that a grain is formed in the normal direction of the curved surface of a product, if so-called undercut, in which the removing direction of the product intersects with the curved surface of the product on a surface along the opening direction of an injection molding metal mode, occurs, the unevenness of the grain on the mold interferes with the unevenness of the grain transferred to a molded product when the molded product is removed; if the molded product is forcibly removed from the metal mold, the grain on the molded product is damaged. To avoid this, it is necessary to prevent the occurrence of the undercut by decreasing the depth of the grain depending on the change in draft as the draft (the supplementary angle of 90° formed by the normal direction of the curved surface of the product and the removing direction of the product) along the opening direction of the mold becomes a range closer to 0°.

Moreover, in the case that a grain pattern is given to a metal mold by the etching method, the depth of the grain cannot be changed continuously; if the depth is made shallow stepwise, the joints thereof are exposed and the appearance is damaged.

On the other hand, in the electroforming method, a thin resin sheet on which a grain is embossed is bonded by hand work to the surface of a model that is formed into the shape of a product, and this is used as a master model and is subjected to resin inversion and electroforming processes to obtain a forming mold. However, when the resin sheet is bonded to a three-dimensional model, elongation or distortion occurs, or nonconformity occurs in the patterns at the joints; hence, the worker requires a lot of skill to make modifications so that these are less noticeable. Besides, due to the result that the method requires many processes, the work period is long and the cost is high; hence, only the special manufacturers having dedicated facilities can adopt the electroforming method. What's more, the shape and size of the grain are determined by the grain on the resin sheet that is bonded when the master model is formed, and it is thus difficult to provide additional patterns at any desired portions later and also difficult to expand or reduce the grain patterns.

Still further, both the methods are disadvantageous in that chemical solution processing or the like is required.

In addition, for the purpose of making it possible to form high-quality grains more easily, a known method has been proposed in Patent Document 1 and Patent Document 2, for example. According to this method, the surface measurement values obtained by reading the surface shape of a leather model or the like are converted into image data in which the depth of the surface shape is represented by the density of 256 gradations, whereby the shape data of the grain pattern is digitized; on the basis of this, processing data is generated using a computer, and by using this processing data, a grain is given to a planar structure, such as an emboss roll or an emboss plate, or to a stereoscopic structure, such as a metal mold, by cutting or laser processing.

When the processing data is generated from the grain shape data, if the processing data is obtained simply by performing projection onto the surface of a stereoscopic structure having a three-dimensional shape, such as a metal mold, individual grain portions are expanded and distorted on the inclined surfaces of the stereoscopic structure; hence, the grain is required to be formed in the normal direction on the curved surface of the product.

For this reason, for the purpose of forming a grain in the normal direction of the surface of a product, modeling software is provided in which voxel data conversion for generating a grain by overlaying voxels on the curved surface of the product is used depending on the density corresponding to the depth of the grain in image data, for example.

In this voxel system, product shape data is converted into voxel data composed of a small sphere or cube, and the pixels of the image data of the grain corresponding to the respective voxel data are determined. Then, the densities of the pixels are converted into displacement amounts, and voxels corresponding to the displacement amounts are overlaid on the voxel data. These are converted into polygon data and final data is obtained.

PRIOR ART DOCUMENT

Patent Document

Patent Document 1: JP-A-H07-241909
Patent Document 2: JP-A-2004-358662

SUMMARY OF THE INVENTION

Problems That the Invention is to Solve

However, in the above-mentioned system, product shape data is first converted into voxel data, therefore a huge amount of data is required.

Furthermore, in consideration of the data processing capability of a general computer, for the surface of a product having a continuously complicated shape formed of a plurality of curved surfaces, a grain is generated in each divided range, and after the grain is generated, it is necessary to perform processing at joints to adjacent grain shapes; however, processing for satisfying this is not yet settled.

In other words, it is difficult that the grain portions at the joints are aligned using the same shape, and for the purpose of making the joints less noticeable, modifications by hand work requiring numerous man-hours are necessary. In addition, the modifications by hand work deform the shapes of the grain portions to be joined; hence, the workmanship varies depending on the skill of the worker, whereby corners are rounded, and grooves and ridges are expanded or bent; consequently, the appearance is frequently degraded away from the intention of the modifications, and the quality becomes unstable. Hence, the reality is that the main application targets of the conventional method are limited to plane surfaces and cylindrical surfaces.

For this reason, the present applicant has already proposed a method in which the shape of a product is converted into a polygon mesh on a free-form surface and local coordinates are set as the respective apexes of the polygons, whereby directions and actual distances on a three-dimensional space are calculated to directly obtain texture information. This method can be adapted to not only a developable surface that can be developed onto a planar surface, as a matter of course, but also a surface having a gentle Gaussian curvature, although the surface is not a developable surface; as a result, a grain can be given to a shape that cannot be represented as a single-valued function, like a folding back portion of a meter hood and so on, in a short calculation time.

However, in the case that a product shape is formed of a non-developable surface and has a large Gaussian curvature or is formed of numerous curved surfaces, thereby having wide areas, although the Gaussian curvatures thereof are gentle, there remains a danger that as the position on the surface is further away from the base point of the local coordinate system, the interval on the texture may become wider and distortion may become larger.

Accordingly, after further improvements, the present invention is intended to provide a method and a device for forming grains with few distortions on a product surface through simple processing not requiring an excessively large amount of data even in the case that a product shape has a large Gaussian curvature or is formed of numerous curved surfaces, thereby having a wide area, although the Gaussian curvatures thereof are gentle, and to provide a method and a device capable of forming surface processing data according to which the joints of grain shapes become smooth even when the data is divided.

Means For Solving the Problems

For the purpose of attaining the above-mentioned objects, the present invention provides a method for forming surface processing data including:

converting the product shape data of an object to which a grain defined by a free-form surface is given into a polygon mesh;

dividing the polygon mesh into regions;

setting one of the divided regions as an initial region, and mapping the texture based on the texture data in the initial region;

synthesizing a new texture being connected to the mapped texture with a change satisfying a predetermined request level;

mapping the new texture repeatedly in regions adjacent to the region in which the texture data is synthesized and having no texture value, thereby mapping the texture in all the regions of the polygon mesh;

displacing the respective apexes of the polygon mesh in the respective normal directions on the basis of the texture mapped to the polygon mesh;

forming new polygon mesh data on the basis of the respective apexes; and using the new polygon mesh data as surface processing data to which the gram is given.

It is preferable that the division of the polygon mesh into regions is performed by dividing the polygon mesh in a predetermined angle range calculated using a predetermined reference axes and the normal direction of the polygon mesh.

Since the synthesis of the new texture is advanced in each region obtained by minutely dividing the entire surface of the product, the texture data is not required to cover the entire surface of the product, and a relatively small size of sample data should only be prepared.

The above-mentioned synthesis of the new texture can be performed by setting an overlapped region between the initial region and an adjacent region adjacent thereto and by performing synthesis in patch unit in the overlapped region, and texture mapping in all the regions of the polygon mesh is performed by mapping the new texture synthesized in the patch unit in the region, being processed and formed of the overlapped region and the adjacent region, and repeating the synthesis of the new texture by using the mapped region being processed and the initial region as a new initial region.

Alternatively, the above mentioned synthesis of the new texture can also be performed by determining pixel information for each apex having no texture value and adjacent to the boundary of the region in which the texture is mapped and thereby performing synthesis, and texture mapping in all the regions of the polygon mesh can also be performed by mapping the new texture synthesized in the pixel unit at the above-mentioned apexes and repeating the synthesis of the new texture at each apex having no texture value.

In addition, the synthesis in the patch unit and the synthesis in pixel unit can be used as selectable modes.

Furthermore, the setting of the overlapped region in the texture synthesis in the patch unit can be performed by searching for the boundary line of the other region of the adjacent region as the line for connecting the apexes of the polygon mash, expanding and multiplexing the boundary line on the outer side of the adjacent region, and setting the region in which the multiplexed boundary lines are overlapped with the initial region as the overlapped region.

At this time, in the polygons in each divided region, an ID is allocated to each region to which the polygons belong; hence, the search for the boundary line can be performed by referring to the ID, whereby the efficiency thereof is improved.

The multiplication of the boundary line is performed by following the apexes in order on the boundary line to obtain the apexes of the other ends of the edge lines connected to the respective apexes, sequentially connecting the apexes of the other ends, expanding a new boundary line on the outside of the boundary line, and sequentially repeating this process, whereby a plurality of expanded boundary lists can be obtained; in the case that the first boundary line is made smooth before the multiplication, the expansion process is simplified.

For the synthesis of a new texture in the patch unit, an image quilting method can be applied by projecting the region being processed onto a two-dimensional plane, setting the rectangular region covering the region being processed on the projecting plane, allocating a new texture to the rectangular region, obtaining an optimal boundary line in which the difference between the texture value of the texture mapped an the initial region and the texture value of the new texture becomes minimal in the overlapped region, and connecting the new texture to the texture mapped in the initial region using the optimal boundary line. Since a relatively considerable amount of textures having the size of the rectangular region is connected, the characteristics of the grain represented by the texture data can be maintained faithfully, and the calculation time for the processing is not required to be long.

It is preferable that the texture most similar to the overlapped region of the texture mapped in the initial region is cut out from the texture data containing the texture mapped in the initial region and then used as the new texture to be allocated to the rectangular region, whereby the optional boundary line in which the deviation between the texture mapped in the initial region and the new texture is particularly small is obtained.

Hence, since the new texture is allocated to the rectangular region on a two-dimensional plane, it is not necessary to follow the complicated contour of the region being processed at the time of cutting out from the texture data, whereby the processing is done simply.

The optimal boundary line can be obtained easily by following one boundary line of the multiplexed boundary lines and by the movement from the current apex to the next apex on the boundary line or to the apex in which the difference in pixel value is minimal among the apexes on the inside boundary line or the outside boundary line being adjacent under the condition that the advance direction is not reversed, whereby smooth connection from the texture mapped in the initial region to the new texture is obtained.

It is desirable that the search for the optimal boundary line is performed while excluding a predetermined number of boundary lines at both ends of the overlapped region.

In the predetermined range in which the optimal boundary line is used as the center, the texture value of the texture mapped in the initial region and the texture value of the new texture allocated to the rectangular region are weighted depending on the distance from the optimal boundary line and mixed, whereby particularly smooth connection is obtained between the too textures.

The synthesis of a new texture in the pixel unit can be performed by searching for an apex having no pixel value and adjacent to an apes having a pixel value in a region, and setting the apex as an object apex in which the pixel value is determined, projecting the predetermined region containing the object apex onto a two-dimensional plane, setting a template containing the object apex and a plurality of apexes adjacent to the object apex and having texture values on the projecting plane, searching for the position of the template in which the difference between the texture data and the texture value of the template becomes minimal, and mapping the texture value of the texture data corresponding to the position of the object apex inside the template at the position of the template having been searched for at the object apex.

The conversion of product shape data into a polygon mesh can be performed by:

dividing the product shape data into a plurality of patches, generating grid points using predetermined division lines in the parameter space of the free-form surface of each patch and generating a point sequence at predetermined internals on the boundary line of the patch, forming a three-dimensional polygon mesh having respective apexes on the free-form surface using the grid points of the patch on the inside of the boundary line and the point sequence on the boundary line, and integrating the polygon meshes of all the patches into one polygon mesh.

At this time, it is preferable that the division lines for generating the grid points and the point sequence on the boundary line of the patch are respectively arranged so as to have uniform intervals in the predetermined ranges, and that the formation of the three-dimensional polygon mesh is performed by connecting the grid points inside the boundary line to form a grid mesh, converting the grid mesh into triangular polygons, and connective the grid points on the outer circumference of the grid mesh to the point sequence on the boundary line to form triangular polygons.

In particular, it is desirable that the point sequence of the patch on the boundary line is shared between the adjacent patches as having the same position.

Furthermore, it is preferable that the displacement amount by which each apex of the polygon mesh is displaced is obtained by multiplying the basic displacement amount based on the texture by the displacement amount reduction ratio corresponding to the draft of the metal mold. Since the displacement amount reduction ratio is changed continuously, no undercut occurs and the depth of the grain is changed smoothly, whereby a good-looking external surface is obtained.

The basic displacement amount of the apex of the polygon mesh can be obtained by multiplying the texture value corresponding to the apex of the texture by a predetermined conversion rate. In addition, it is preferable that the texture data is image data in which the pixel value obtained by allocating the depth of a grain with respect to two-dimensional positional coordinates to density gradation is used as a texture value.

Since the texture data itself can represent the texture using a small amount of data, data processing is made simply.

Advantage of the Invention

In the present invention described above, the product shape data is first converted into a polygon mesh and then processed as curved surface data having no thickness, whereby the amount of data to be processed can be made small.

The polygon mesh is divided into regions, and a texture that is connected to the texture in the previously mapped region while having predetermined smoothness is mapped in an adjacent region; this process is repeated sequentially to map the texture in the entire polygon mesh, whereby through the selection of the fineness of the division of regions, there is provided an effect that a good-looking grain with few distortions can be given even in the case of a product shape whose surface cannot be developed.

Furthermore, since the synthesis of the new texture is advanced in each divided region, the texture data is not required to have a size covering the entire surface of the product; hence, a relatively small size of sample data should only be prepared.

BRIEF DESCRIPTION OF THE DRAWINGS

FIG. 2 is a main flow chart showing the flow of processing in the device for forming surface processing data;

FIG. 4 is a flow chart showing the details of the forming of a triangular polygon mesh;

FIG. 6 is a view showing grid points and a boundary line;

FIG. 16 is an explanatory view showing a procedure of smoothing a boundary line;

FIG. 17A is an explanatory view showing a procedure of smoothing a boundary line;

FIG. 22 is an explanatory view showing a procedure of mixing pixel values;

MODES FOR CARRYING OUT THE INVENTION

An embodiment according to the present invention will be described below.

Figure 1:
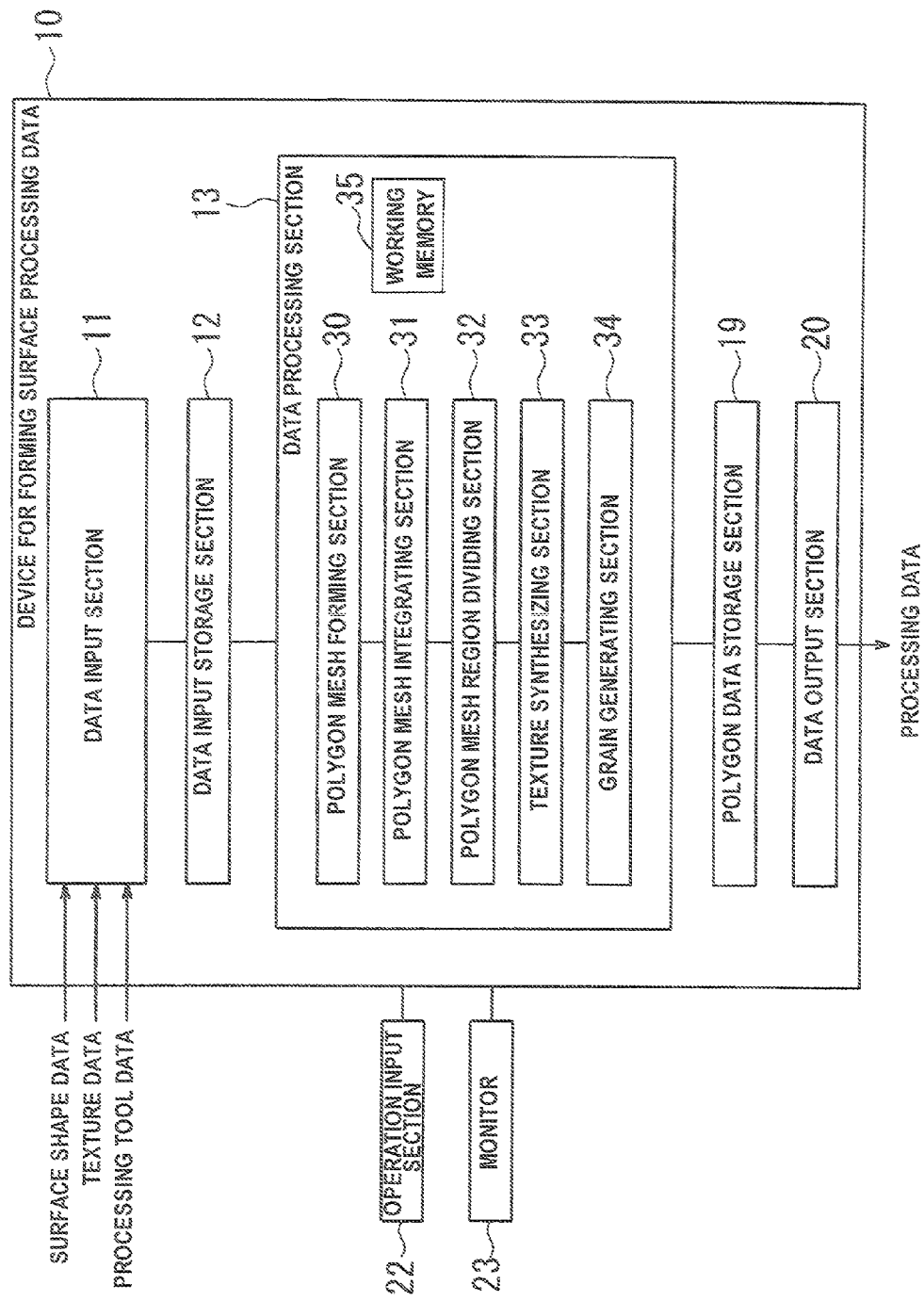
FIG. 1 is a block diagram, showing a configuration of a device for forming surface processing data according to an embodiment.

FIG. 1 is a block diagram showing a configuration of a device for forming surface processing data according to an embodiment.

A device for forming surface processing data 10 has a data input section 11 for inputting the surface shape of a product, the texture data of a grain and processing tool data; an input data storage section 12; and a data processing section 13 for generating polygon data in which a grain shape is given to the curved surface of the product on the basis of the data stored in the input data storage section 12; a polygon data storage section 19 for storing the generated polygon data; and a data output section 20 for outputting the polygon data as processing data from the polygon data storage section 19.

An operation input section 22 equipped with a keyboard, a jog lever, etc. and a monitor 23 capable of displaying image data are connected to the device for forming surface processing data 10.

Surface shape data serving as product shape data to be input to the data input section 11 is defined by a free-form surface in which the respective coordinates frequently used as CAD data are represented as a function of parameters u and v in $S=F(u, v)$, is formed of patch information divided into a plurality of curved surfaces by boundary lines previously represented by free curves and is stored in the input data storage section 12.

The boundary lines include so-called trim lines and include boundary lines that are not provided with patches adjacent to and away from the fringes of the shape of the product, unless otherwise specified.

The surface shape data contains the entire size of an object part (hereafter referred to as a grain-given object) to which the grain of the product is given.

The texture data is two-dimensional gray scale data of 256 gradations in which the depth of the grain is allocated to density and can represent texture using a small amount of data, whereby the processing of the data is easy.

In addition, even a region having an area size being approximately two to four times the area projected onto the two-dimensional plane of a polygon mesh region divided as described later can be processed; hence, the amount of data can else be made small in this respect.

The texture data is read as pixel values to be processed using the data processing section 13.

The processing tool data contains, for example, the division angle for dividing a polygon mesh into regions; the number of the boundary lines expanded to form an overlapped region in a patch unit mode described later; the maximum distance from an optimal boundary line for determining the range of weighting at the time of texture mixing; the number of the lines to be excluded when the optimal boundary line is searched for; the size of a predetermined region to be projected in a pixel unit mode; the size of each template to be used in the patch unit mode and the pixel unit mode, and the mold opening direction of an injection mold to be used for the calculation of a reduction ratio that is changed depending on the inclination of the draft angle.

The data processing section 13 is particularly intended to give a smoothly continuous grain with arbitrary accuracy even on a free-form surface including a non-developable surface and generates a grain by applying image quilting in which predetermined regions are copied from sample textures and synthesized when a texture to be applied to the surface of a product is determined.

For this reason, the data process section 13 is equipped with a polygon mesh forming section 30, a polygon mesh integrating section 31, a polygon mesh region dividing section 32, a texture synthesizing section 33, a grain generating section 34, and a working memory 35.

The polygon mesh forming section 30 forms a triangular polygon mesh on the free-form surface of each patch W, and the polygon mesh integrating section 31 integrates the triangular polygon meshes of all the patches W constituting the surface shape data into a piece of file data.

The polygon mesh region dividing section 32 performs region division for the integrated triangular polygon mesh at a predetermined angle from the normal direction, for example, the z-axis, thereby determines an initial region.

The texture synthesizing section 33 maps the texture in the triangular polygon mesh of the initial region, and synthesizes continuous grain images by texture synthesis in adjacent regions; the mapping is repeated sequentially in respective regions. At this time, by the selection from the operation input section 22, a mode in which the allocation of a new texture to a region being processed is performed in patch units and a mode in which the allocation is performed in pixel units are available as described later.

On the basis of the density gradations of the texture data corresponding to the respective apexes of the integrated polygon mesh, the grain generating section 34 displaces the positions of the respective apexes and generates polygon data to which the grain is given.

With respect to the displacement of the apex positions of the integrated polygon mesh, the amount of the displacement is changed by applying a displacement amount reduction ratio depending on the draft of a metal mold, thereby preventing the occurrence of undercut at the time of mold removal. In the date processing section 13, a plurality of change formulas for determining the displacement amount reduction ratio have been set previously, and one of the change formulas is selectable through the operation of operation input section 23 in consideration of the characteristics of molding material and the shame of the product, for example.

In the working memory 35, the processing data in the respective sections inside the data processing section 13 is temporarily stored.

The data processing section 13 causes the polygon data to which the grain is given to be stored in the polygon data storage section 19.

The monitor 23 can display the progress state of each process as well as images.

Next, the details of the processing in the above-mentioned device for forming surface processing data will be described.

FIG. 2 is a main flow chart showing the flow of processing.

When the surface shape data of the product, the texture data of the grain, information on the angle of the mold opening direction, the interval upper-limit value b of the integrated polygon mesh described later, the division angle for the division of polygon mesh regions, the number of the boundary lines expanded to form the overlapped region, the maximum distance from the optimal boundary line, and the number of the lines to be excluded from the search are input to the data input section 11 through the operation of the operation input section 22, the respective pieces of data are stored in the input data storage section 12 thereby the processing is started. At the time of the data input, the texture allocation mode and the change formula for determining the displacement amount reduction ratio are also selected by the operation input section 22.

First, at step 100, the polygon mesh forming section 30 reads the information of the patch W from the input data storage section 12 and forms a triangular polygon mesh Qc.

At step 101, a check is performed to determine whether unprocessed patch information still remains in the input data storage section 12, that is, whether the forming of the triangular polygon meshes Qc of all the patches W has been completed.

When the forming of the triangular polygon meshes Qc of all the patches W has not been completed, the processing returns to step 100.

When the forming of the triangular polygon meshes Qc of all the patches W has been completed and when no unprocessed patch information remains in the input data storage section 12, the processing advances to step 102.

At step 102, the polygon mesh integrating section 31 integrates the triangular polygon meshes Qc of all the patches W into a file of an integrated polygon mesh QT indicating a single curved surface.

At step 103, the polygon mesh region dividing section 32 divides the integrated polygon mesh QT into regions.

At this step, the division is performed using the angle range calculated using a reference axis and the normal direction of the polygon mesh. The angle range is given as the division angle of the processing tool data.

Figure 3A:
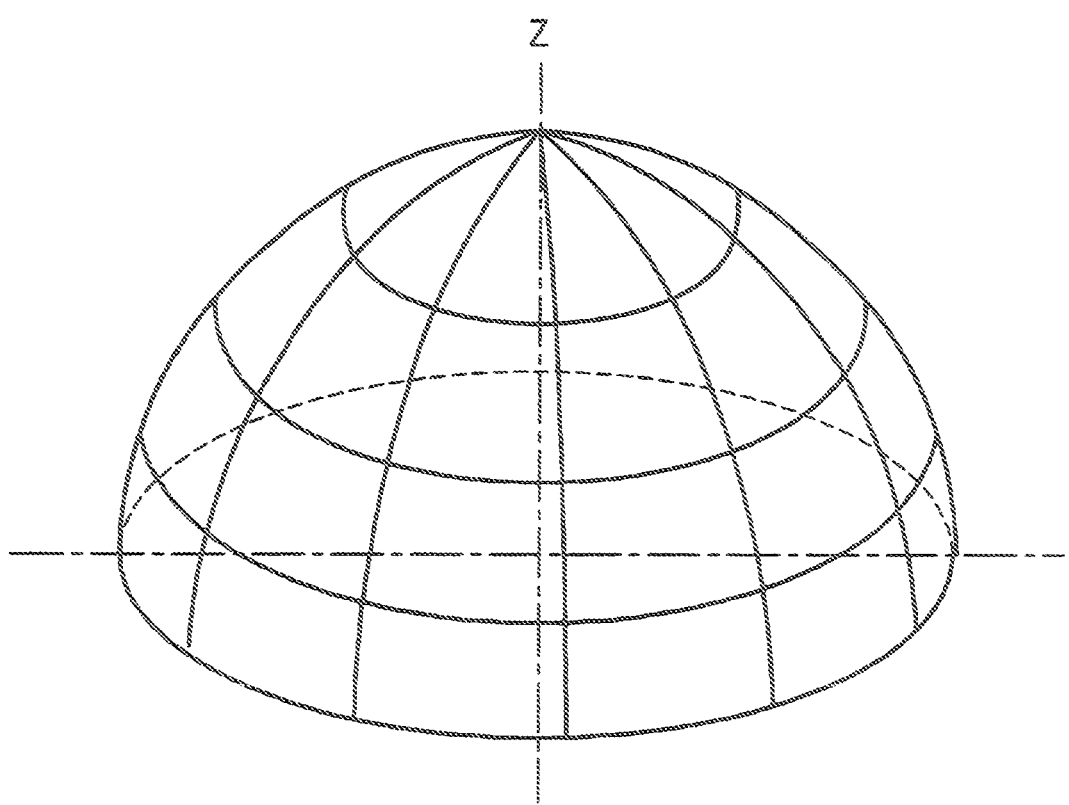
FIG. 3A is an explanatory view showing the concept of dividing a polygon mesh into regions.

By using a Gaussian hemisphere as an example, FIG. 3A shows an example in which the z-axis direction is schematically used as the metal mold removing direction, and with respect to the normal direction of the mesh around the vertex serving as the maximum point on the z-axis, 360° is divided into 12 equal parts in the longitudinal direction and 90° is divided into four equal parts in the latitudinal direction. As the number of divisions in each direction is increased, that is, as the range or the angle is made smaller, the deviation of the apexes of the triangular polygon mesh becomes smaller and the accuracy thereof becomes higher when projected onto a two-dimensional plane as described later.

At step 104, the texture synthesizing section 33 performs texture synthesis and performs mapping so that the adjacent boundary portions change smoothly in each polygon mesh region having been divided.

At step 105, on the basis of the texture data and the processing tool data, the grain generating section 34 moves the respective apexes of the integrated polygon mesh QT by displacement mapping and stores them in the polygon data storage section 19 as polygon data to which the grain shape is given.

After the forming of the polygon data is completed, the fact that the processing has been completed is displayed on the monitor 23 at step 106 and the processing ends.

Then, the data output section 20 reads the polygon data from the polygon data storage section 19 through the operation of the operation input section 21, whereby the polygon data can be output as processing data to processing apparatuses, for example.

FIG. 4 is a flow chart showing the details of the forming of the triangular polygon mesh Qc at step 100.

Figure 5A:
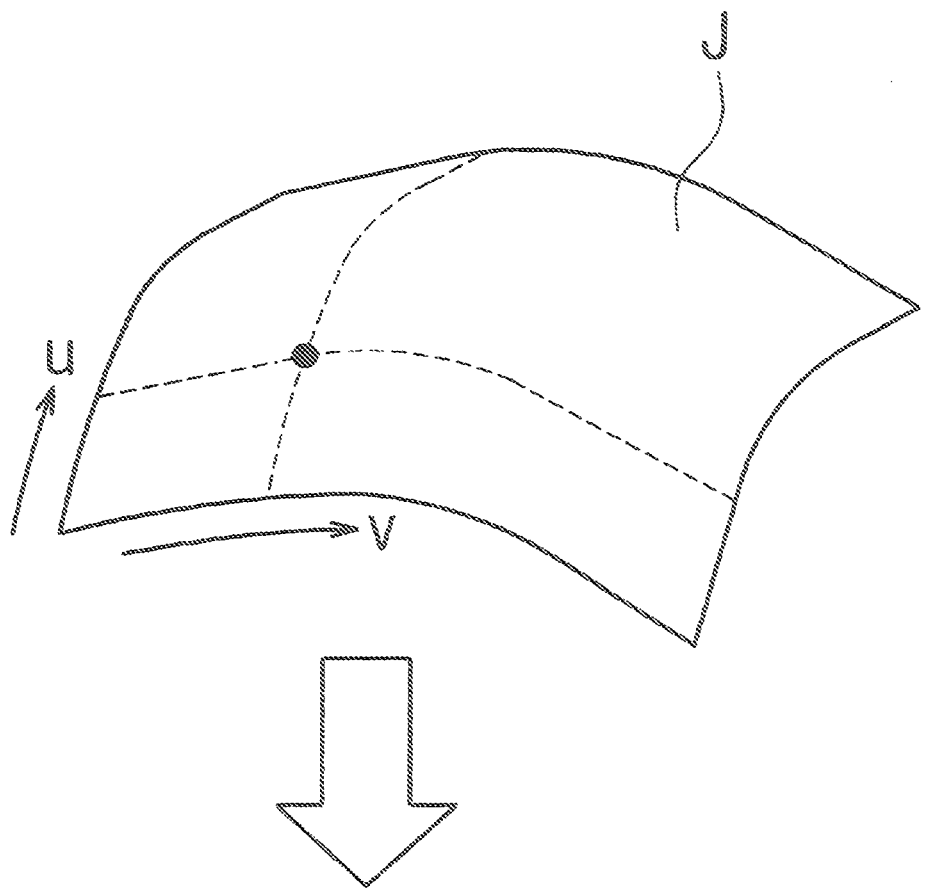
FIG. 5A is a schematic view showing a division procedure in the patch.
Figure 5B:
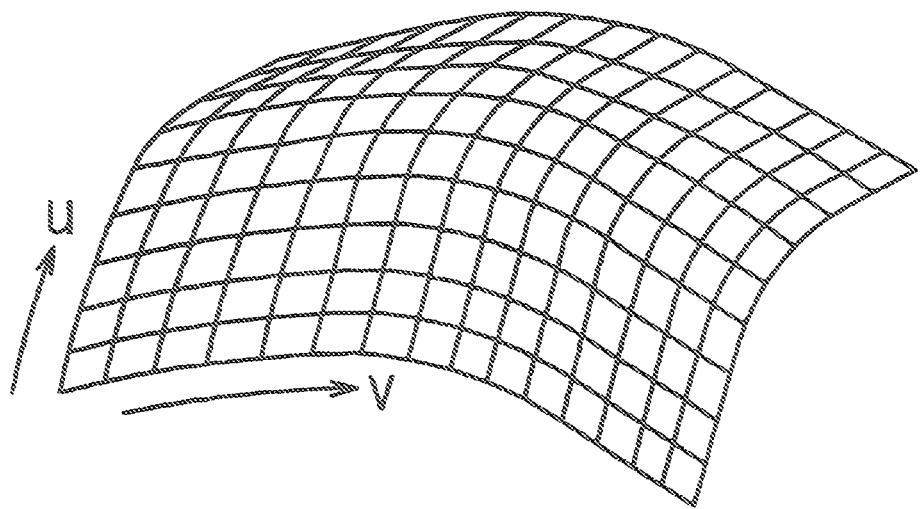
FIG. 5B is a schematic view showing the division procedure in the patch.

At step 200, the number of the divisions of the parameters u and v that divides the free-form surface J of the selected patch, shown in FIG. 5A, so that the interval of the grids on the free-form surface J becomes equal to or less than the interval upper-limit value b, is calculated. For example, the parameter interval (the maximum value–the minimum value) of u or the patch W is divided by an arbitrary integer m to obtain a parameter interval c. The patch is divided by c and compared with the interval upper-limit value b; in the case that the obtained value is larger than b, m is increased. This process is repeated until all the grid intervals become smaller than the interval upper-limit value b. A similar process is also performed for the parameter v. FIG. 5B shows the division lines on the free-form surface.

At step 201, the parameter values at respective grid points are calculated using the respective division numbers of u and v calculated as described above, and points are generated on the free-form surface as shown in FIG. 6. These generated points are hereafter referred to as grid points Ca. FIG. 6 is a magnified view along the u-v plane, and an isoparametric curve is omitted for the sake of simplicity.

At step 202, the grid points Ca for forming polygon meshes are extracted.

Figure 7:
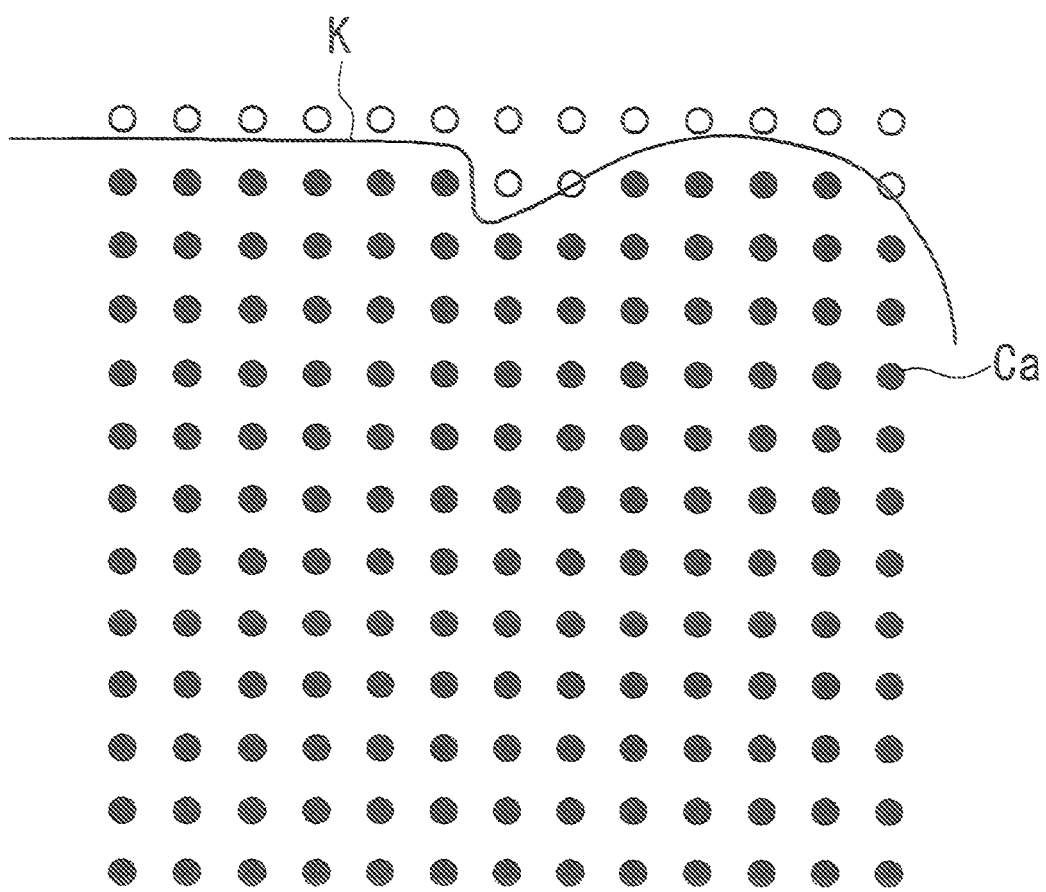
FIG. 7 is an explanatory view showing a procedure of extracting grid points for forming a polygon mesh.

More specifically, among the grid points Ca, those existing on the outside of the boundary line including the boundary line K of the patch W, indicated by open circles in FIG. 7, are omitted, and furthermore, those existing inside the boundary line K but being away from the boundary line by a distance of less than $1/100$ of the grain interval are omitted. The grid interval may be the interval upper-limit value b or may be a grid interval divided actually.

The boundary line K includes a trim line and is represented by a B-spline curve. The shape of the boundary line K is arbitrary for each patch.

The reason why the grid points Ca being away from the boundary line K by less than the predetermined distance are omitted is to avoid the polygons formed using the points on the boundary line K from becoming very small as described next.

Figure 8:
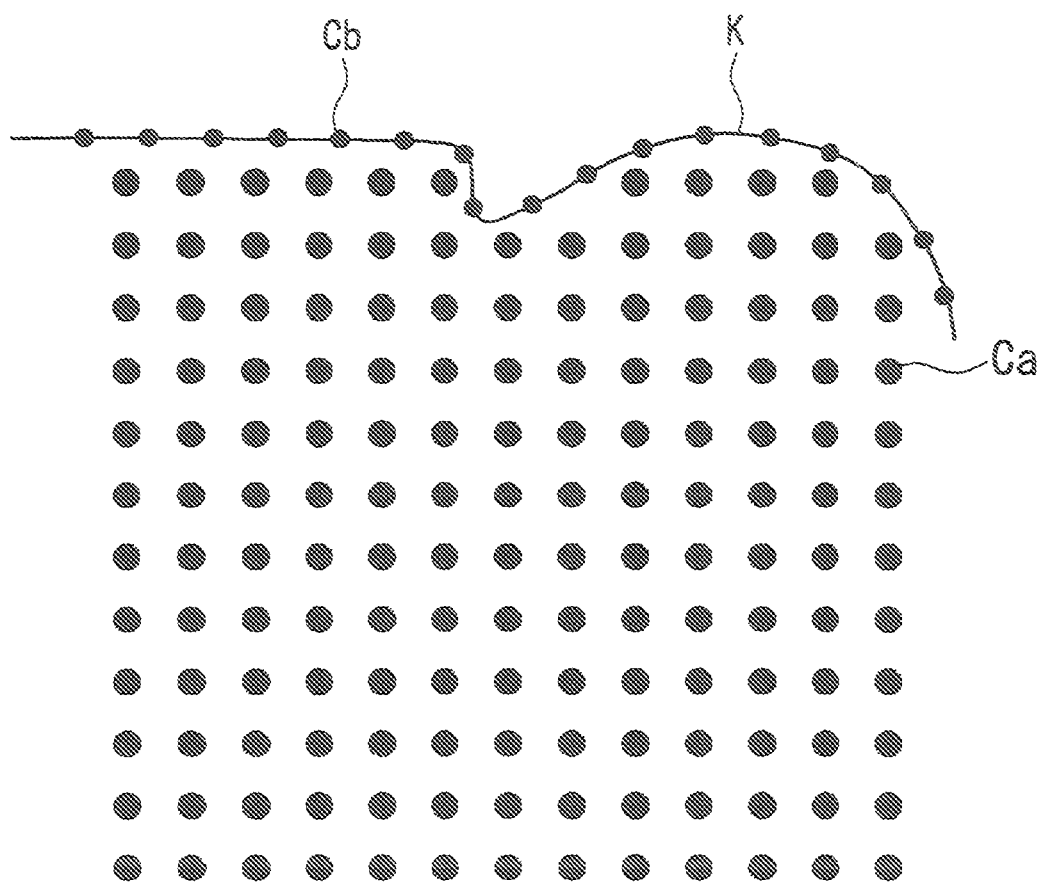
FIG. 8 is an explanatory view showing a procedure of generating a point sequence on the boundary line.

At step 203, the division number for dividing the boundary line K so that the interval becomes equal to or less than the interval upper-limit value b, and at step 204, as shown in FIG. 8, a point sequence Cb is generated on the boundary line K using the division number. The individual points of the point sequence are also indicated by Cb in the following description.

The division number can be set to a value by which the entire circumference is equally divided as in the case of the grid points Ca; however, it may be possible that equal division is performed for the division of the grid points Ca and the division of the point sequence Cb using the interval upper-limit value b and that only the last portion exceeding the interval upper-limit value b is halved. As a result, the grid points and the point sequence respectively have uniform intervals within predetermined ranges.

In the case that adjacent patches W1 and W2 are present, that is, in the case of patches sharing a boundary line, in the range in which the patches W1 and W2 of the boundary line K are adjacent to each other, boundary lines K1 and K2 of the respective patches are represented by the same curve formula so that the same point sequence Cb is generated.

In the case that expression formulas are not identical, it is assumed that the two curves are identical with respect to phase, and the point sequence Cb generated on the boundary line K1 of one of the patches, i.e., the patch W1, is shared as the point sequence on the boundary line K2 of the other patch W2.

Figure 9:
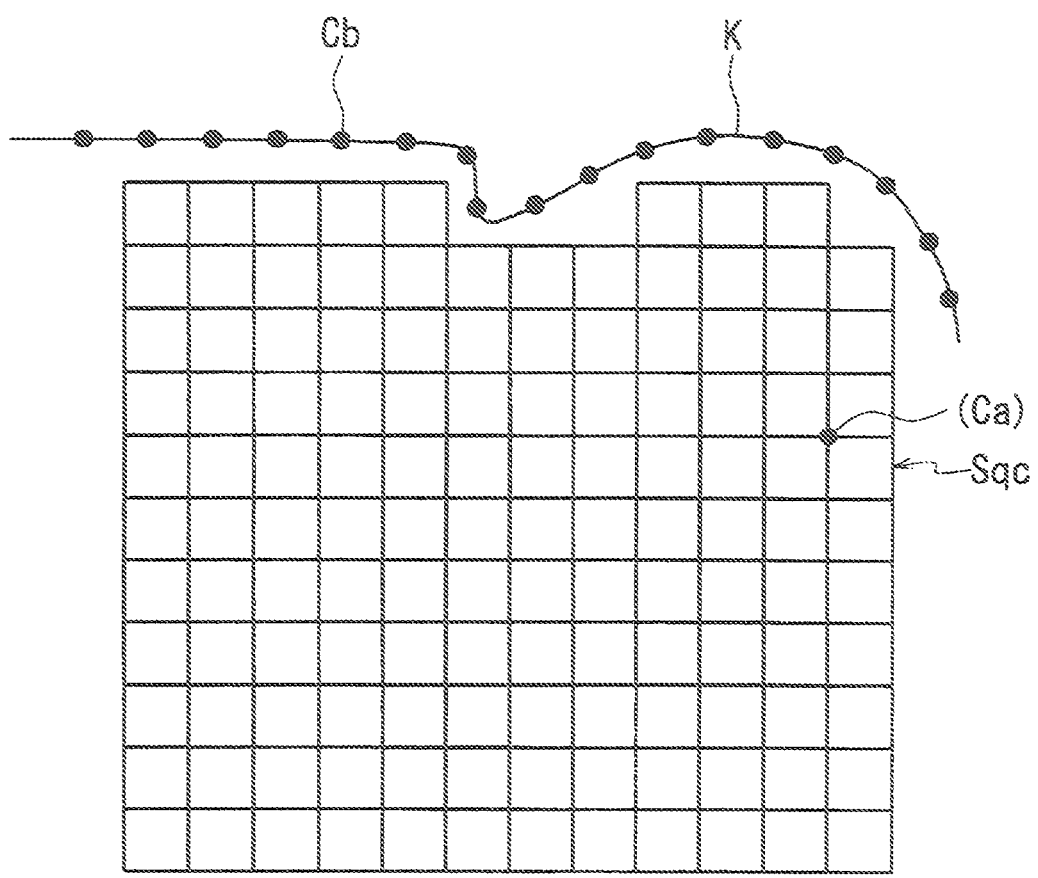
FIG. 9 is a view showing a square grid mesh generated using the grid points.

It step 205, as shown in FIG. 9 using the grid points Ca extracted at step 412 described previously, a square grid mesh Sqc is generated. Although the respective intersections correspond to the grid points Ca, the representation thereof using black circles is omitted.

Figure 10:
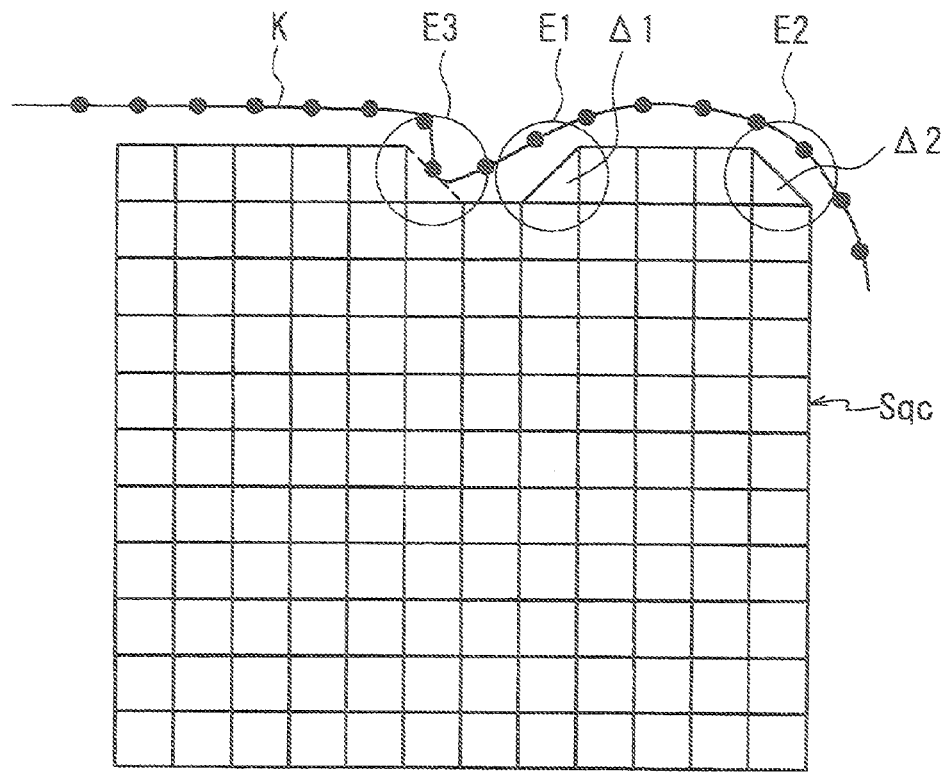
FIG. 10 is an explanatory view showing a procedure of forming triangles in the concave portions on the outer circumference of the square grid mesh.

At step 206, in the case that the outer circumferential shape of the square grid mesh Sqc is a stepped shape and has concave portions, as shown at portions E1 and E2 in FIG. 10, the two grid points on the outer circumference and on both sides of the inner angles of the concave portions are connected using straight lines to form triangles $\Delta 1$ and $\Delta 2$. However, in the case that the straight line connecting the two grid points intersects the boundary line K as shown by a broken line at portion E3, no triangle is formed.

Figure 11:
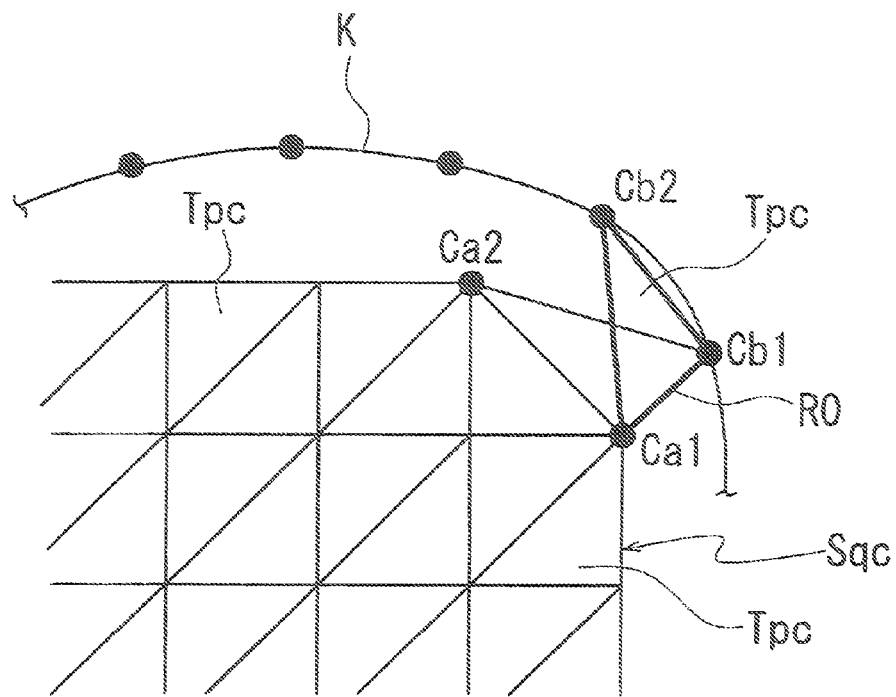
FIG. 11 is a view showing a procedure of generating a triangular polygon using the square grid mesh and the point sequence on the boundary line.

At step 207, as shown in FIG. 11, grid points located at one set of diagonal positions in each grid of the square grid mesh Sqc are connected to generate a triangular polygon Tpc.

Then, at step 208, a triangular polygon is generated between the grid points Ca located on the outer circumference of the square grid mesh Sqc and the point sequence Cb on the boundary line K.

At this step, as shown in FIG. 11, first, one grid point Ca1 located on the outer circumference is selected and this point is connected to the point Cb1 located on the boundary line K nearest to the point. While the straight line R0 for the connection is shared as one side, a triangle $\Delta$Ca1-Cb1-Ca2 formed of the adjacent grid point Ca2 located on the outer circumference of the square grid mesh Sqc and a triangle $\Delta$Ca1-Cb1-Cb2 formed of the adjacent grid point Cb2 located on the boundary line K are calculated, and one of these two triangles, closer to an equilateral triangle, is adopted as the triangular polygon Tpc.

The determination as to whether a triangle is closer to an equilateral triangle can be made depending on the fact that the difference between the maximum inner angle and the minimum inner angle of the triangle is closer to 0 (zero) or depending on the fact that the ratio between the length of the longest side and the length of the shortest side is closer so 1.

Next, the above-mentioned process is repeated for a grid point (for example, Ca2) on the outer circumference of the square grid mesh Sqc sequentially adjacent to the grid point Ca1 selected as described above. The sequence according to which the process is repeated should only be determined previously so that the process is repeated in a direction being adjacent counterclockwise or clockwise.

Figure 12:
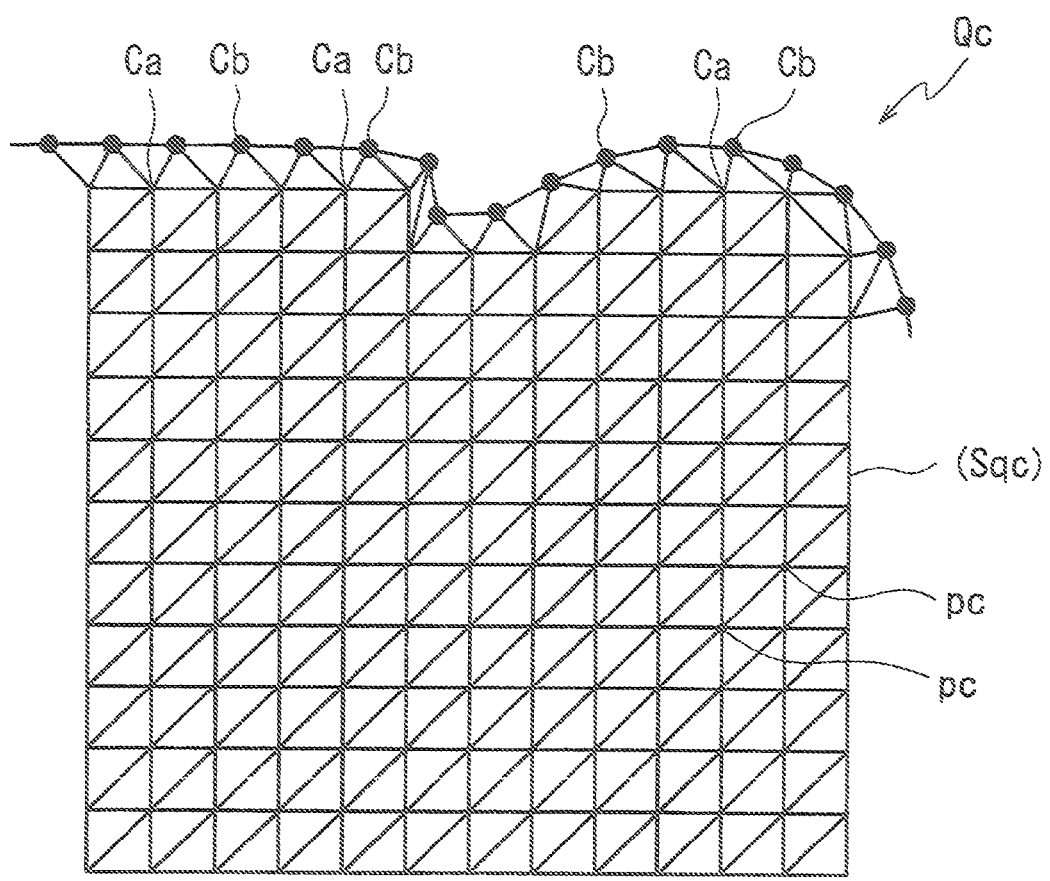
FIG. 12 is a view showing a triangular polygon mesh generated on the patch.

As a result, as shown in FIG. 12, the triangular polygon mesh Qc expanding from the outer circumference of the square grid mesh Sqc to the point sequence Cb on the boundary line K is generated on the free-form surface J of the patch.

At step 209, the triangular polygon mesh Qc is shaped by edge swap. The triangular polygon mesh generated at step 208 is generated by selecting a triangle closer to a wellformed equilateral triangle at each step; however, a better triangle can be generated in some cases by edge swap in view of the whole of the generated triangular polygon mesh.

Figure 13:
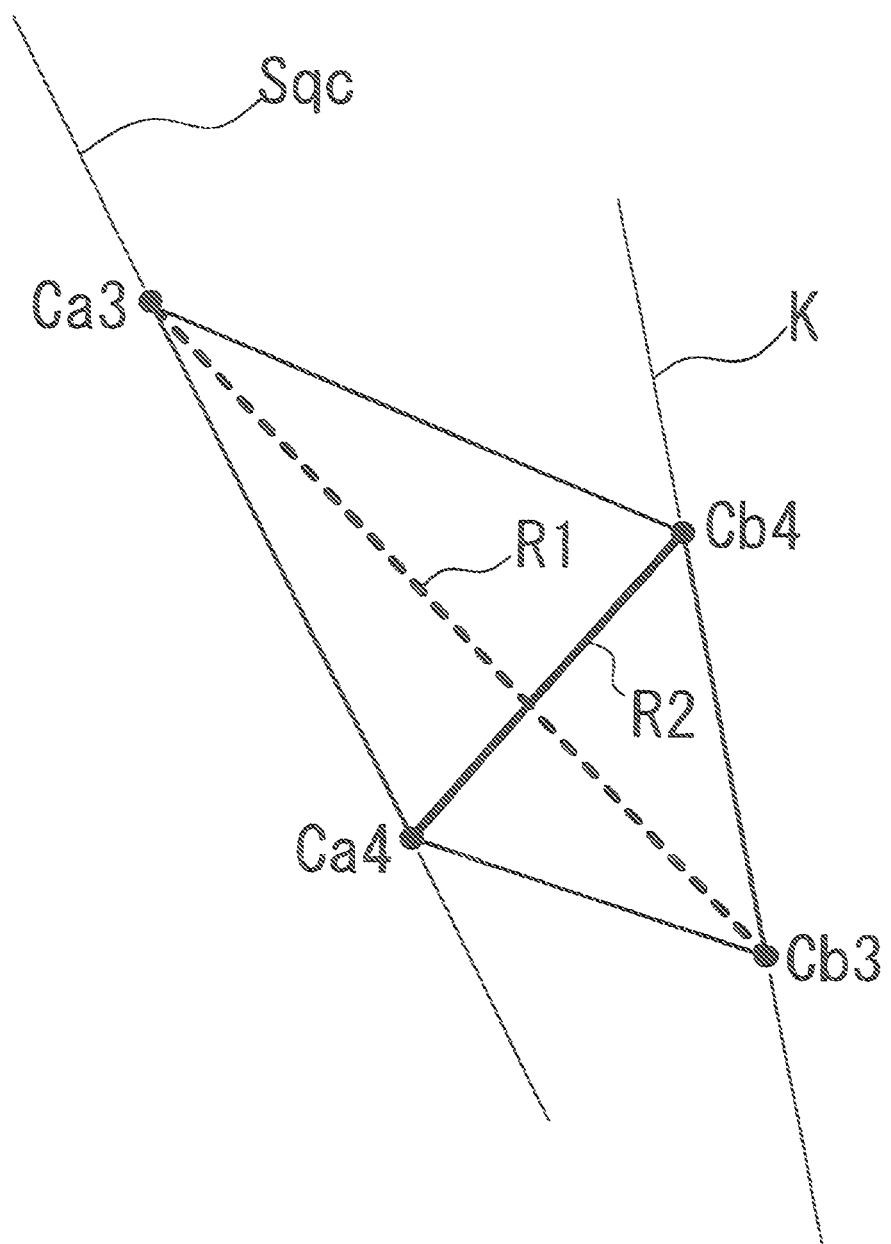
FIG. 13 is an explanatory view showing a procedure or shaping the triangular polygon mesh.

At this step, for one edge line R1 obtained by connecting the grid point Ca3 on the outer circumference of the square grid mesh Sqc to the point Cb3 on the boundary line, indicated by a broken line in FIG. 13, wherein triangular polygons are present on both sides thereof, an edge line R2 is calculated which is obtained by connecting the point Cb4 on the boundary line constituting one of the triangular polygons to the grid point Ca4 on the outer circumference constituting the other triangular polygon, as indicated by a thick solid line. Hence, the two triangles (the triangles obtained after edge swap formed on both sides of the new edge line R2 are obtained.

As shown in FIG. 13, in the case that the two triangles $\Delta$Ca4-Cb4-Ca3 and $\Delta$Ca4-Cb4-Cb3 after edge swap are closer to an equilateral triangle than the two triangles $\Delta$Ca3-Cb3-Cb4 and $\Delta$Ca3-Cb3-Ca4 before edge swap, the edge line R1 indicated by the broken line is omitted, and the triangular polygons are replaced with the triangles $\Delta$Ca4-Cb4-Ca3 and $\Delta$Ca4-Cb4-Cb3 after edge swap and the polygons after edge swap are adopted as triangular polygons.

The triangular polygon mesh Qc is shaped by repeating the above-mentioned process with respect to the sequentially adjacent grid points on the outer circumference of the square grid mesh Sqc.

As described in the process at step 204, between the patches sharing a boundary line, the point sequence on the boundary line is shared; hence, in the integration of the triangular polygon mesh Qc at step 102, the respective patches continue without disconnection, whereby one integrated polygon mesh QT as obtained.

The grid points Ca and the points Cb on the boundary line become the apexes pc of the integrated polygon mesh QT (refer to FIG. 12).

Figure 14:
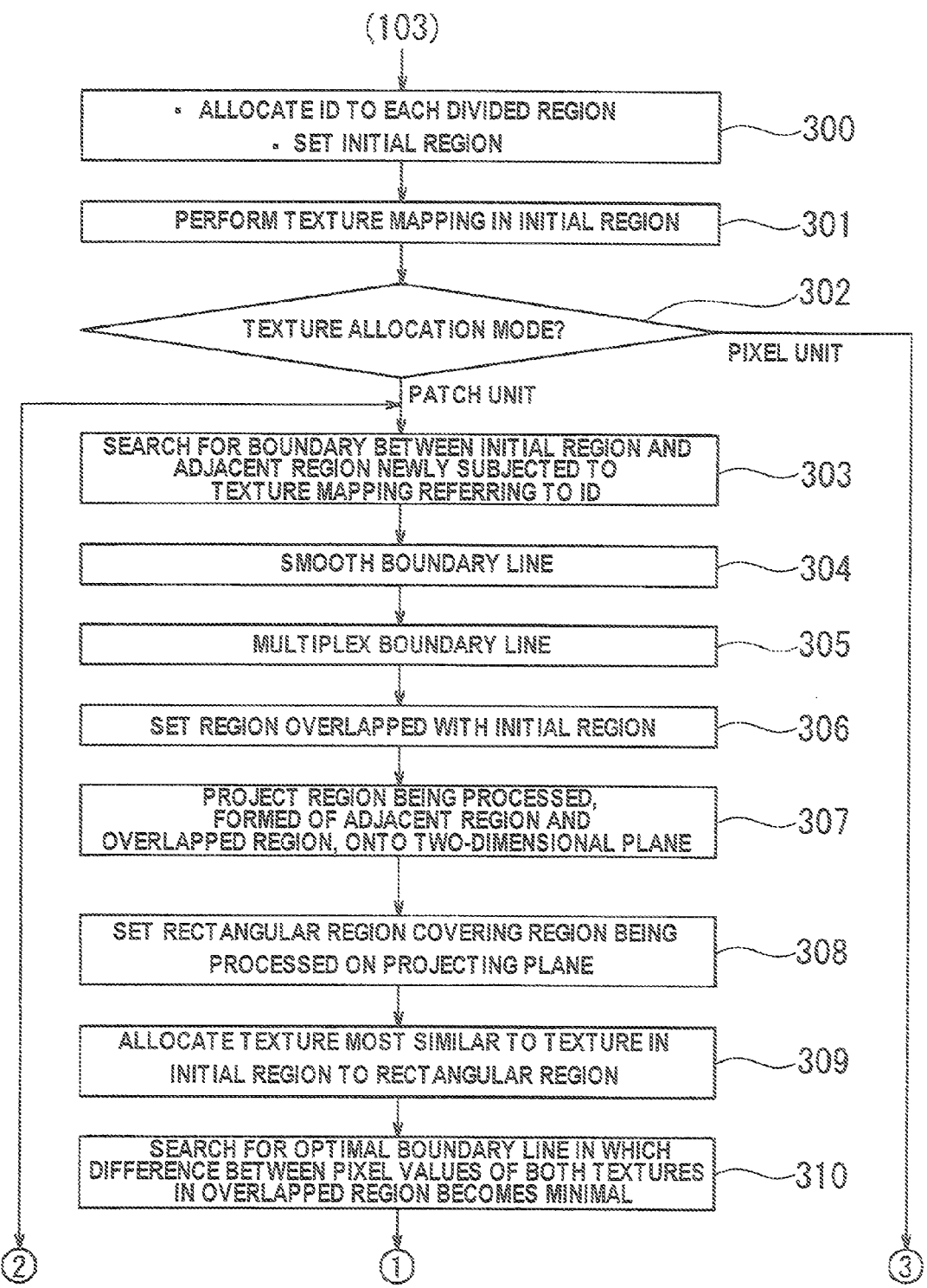
FIG. 14 is a flow chart showing the details of texture synthesis and mapping.
Figure 15:
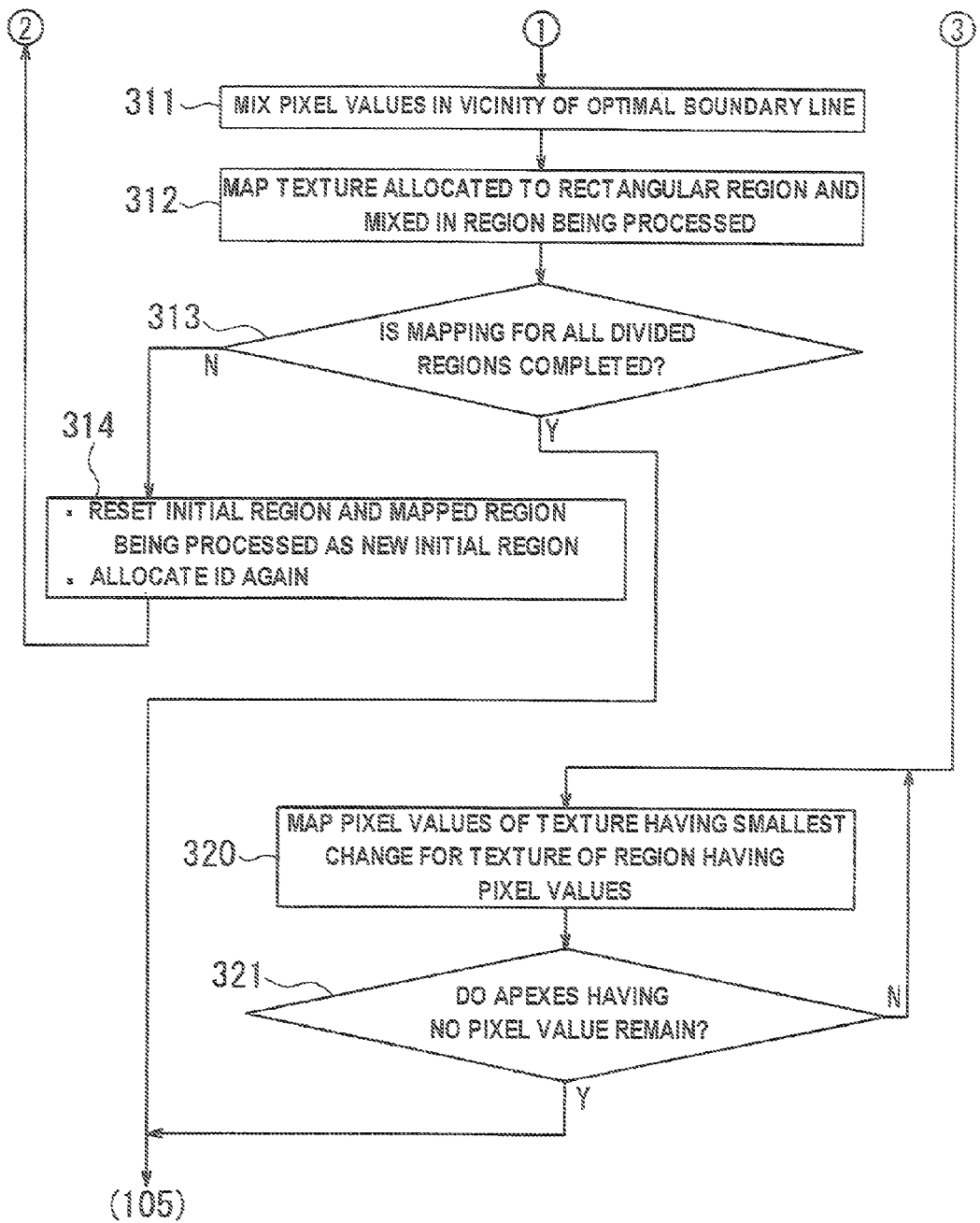
FIG. 15 is a flow chart showing the details of texture synthesis and mapping.

FIGS. 14 and 15 are flow charts showing the details of the texture synthesis and mapping at step 104 of the flow chart shown in FIG. 2.

At step 300, an ID inherent in region is allocated to the triangular polygon constituting each region of the integrated polygon mesh divided into regions at step 103 described above, and one region is set as an initial region.

Figure 3B:
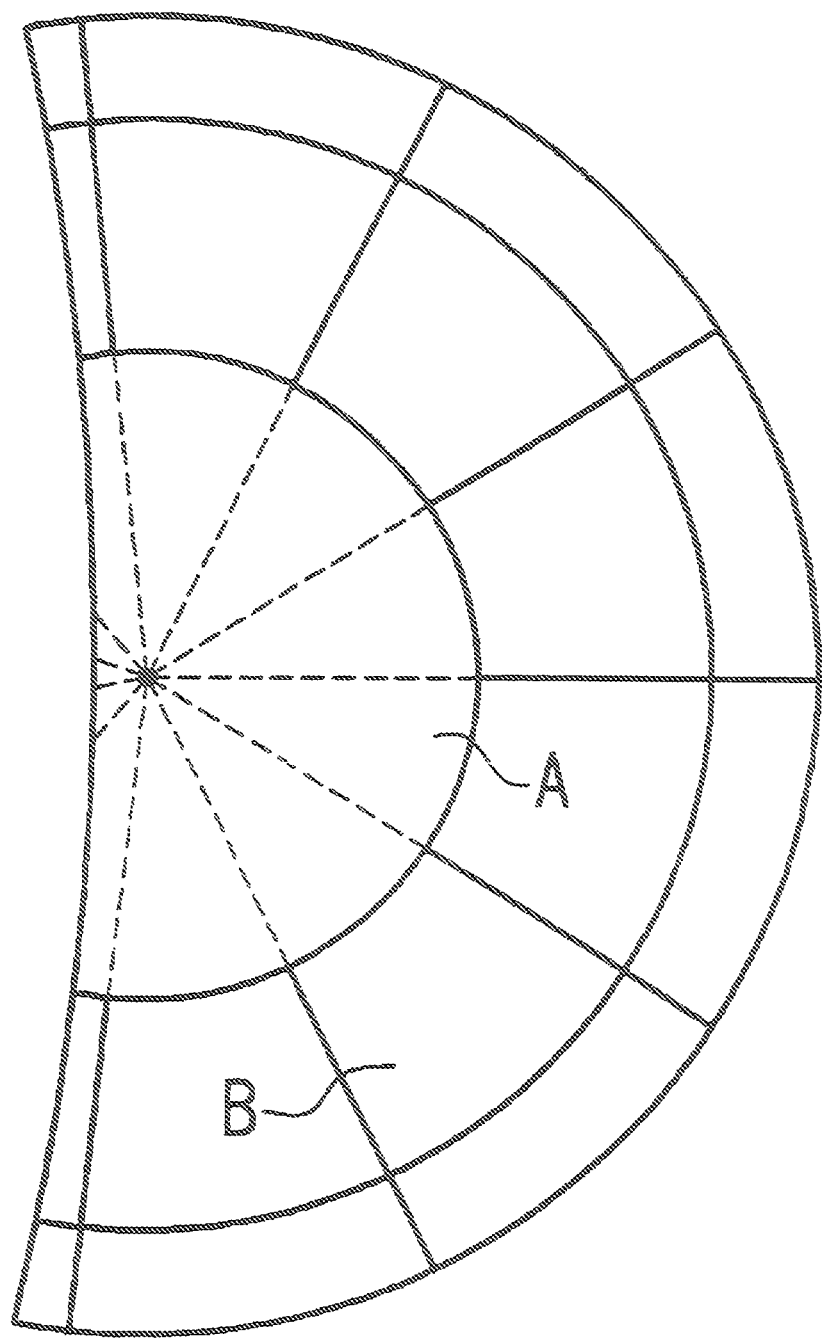
FIG. 3B is an explanatory view showing the concept of dividing the polygon mesh into regions.

For example, in the example shown in FIG. 3B, in consideration that the regions enclosing the vertex are projected in the z-axis direction, the regions are integrated into one region; this region is used as an initial region A.

At step 301, the texture synthesizing section 33 cuts out an arbitrary texture GA covering the initial region A from the texture data scored in the input data storage section 12, performs projection onto the initial region A in the reference direction (the z-axis direction, and performs the mapping of the pixel value information of the texture (hereafter simply referred to as texture mapping).

Next, at step 302, a check is performed to determine whether the texture allocation mode selected previously is the patch unit mode or the pixel unit mode.

When the mode is the patch unit mode, the processing advances to step 303, and when the mode is the pixel unit mode, the processing advances to step 320.

at step 303, in preparation for the setting of overlapped region, a boundary line F0 passing through the circumferential fringe of an adjacent region B (refer to FIG. 3B) adjacent to the initial region A is searched for by following the apexes of the triangular polygons. Since an ID inherent in region is allocated to each triangular polygon, the search can be performed efficiently.

Furthermore, for the purpose of simplifying the expansion of the boundary line performed at a latter stage, the boundary line F0 searched for as described above is smoothed at step 304.

More specifically, as shown in FIG. 16, if the two continuous edge lines constituting the boundary line F0 are two sides of one triangle, the two sides are replaced with the edge line of the remaining one side of the triangle and a boundary line F1 is formed. The black circles in the figure represent the apexes of the polygon mesh.

Figure 17B:
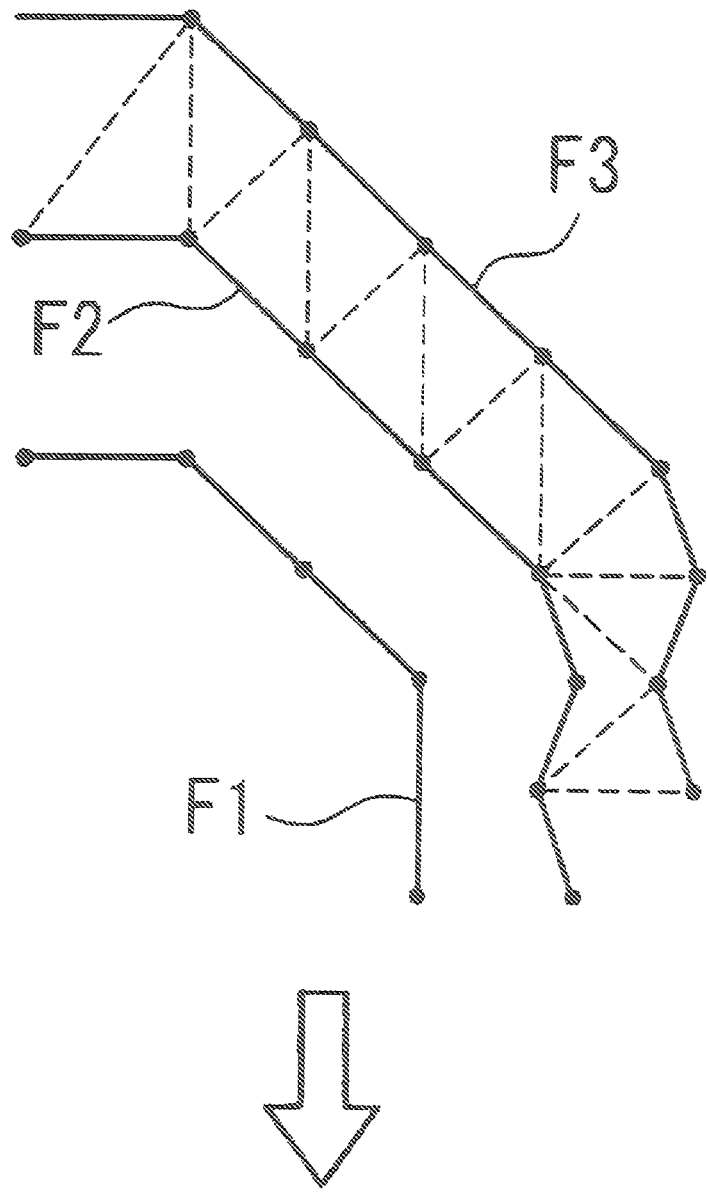
FIG. 17B is an explanatory view showing a procedure of smoothing a boundary line.
Figure 17C:
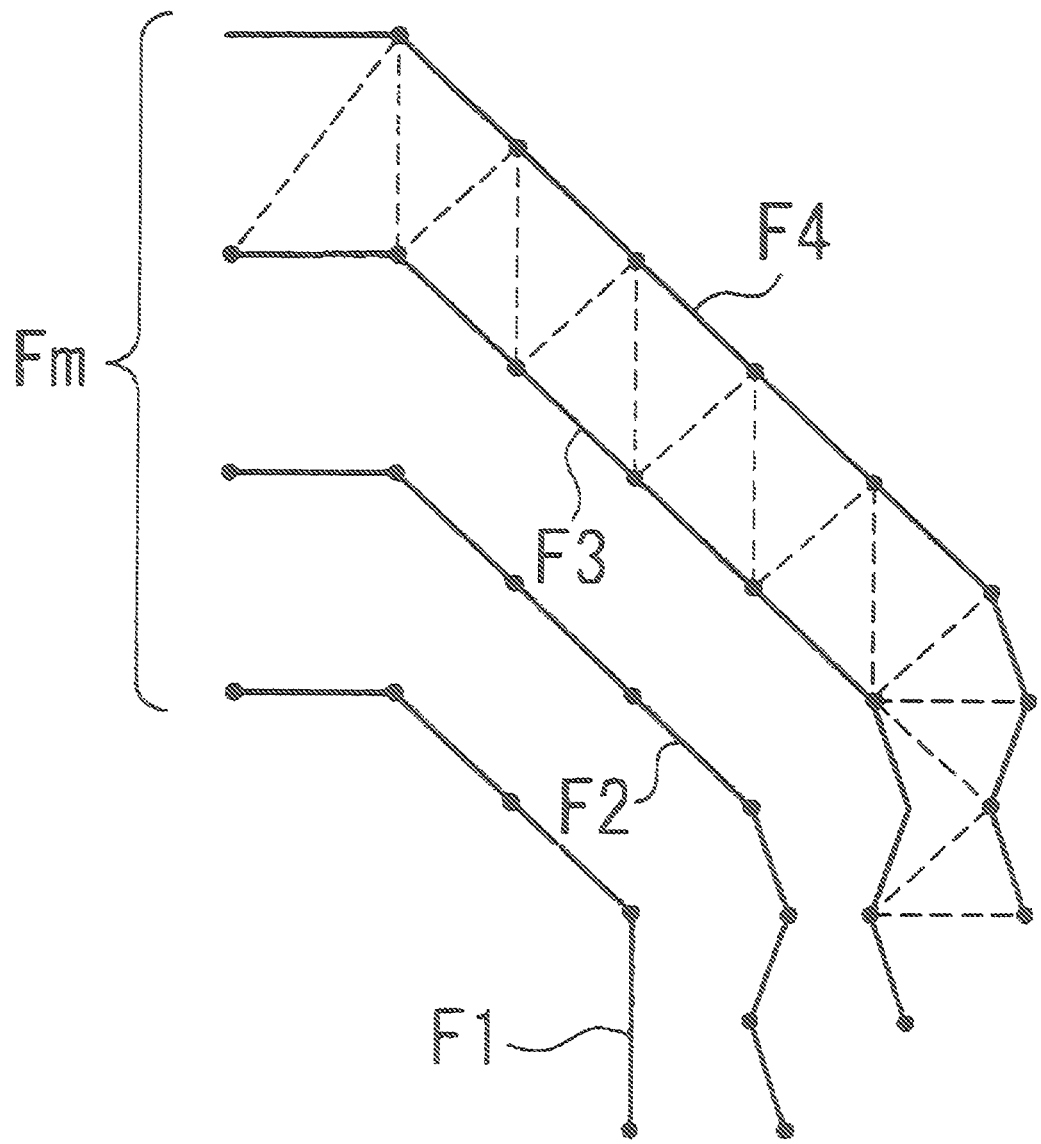
FIG. 17C is an explanatory view showing still yet another procedure of smoothing a boundary line.

At step 305, as shown in FIG. 17A, the apexes on the smoothed boundary line F1 are followed sequentially in the direction of the arrow to obtain the apexes of the other ends of the edge lines (broken lines) connected to the respective apexes (black circles), and these are connected and expanded to obtain a boundary line F2. Next, as shown in FIG. 17B, the other ends of the edge lines connected to the respective apexes are connected in a similar way on the basis of the boundary line F2 to obtain a boundary line F3. FIG. 17C shoes the setting of a boundary line F4 based on the boundary line F3. These boundary lines F are expanded outward by one triangle constituting the polygon mesh.

Figure 3C:
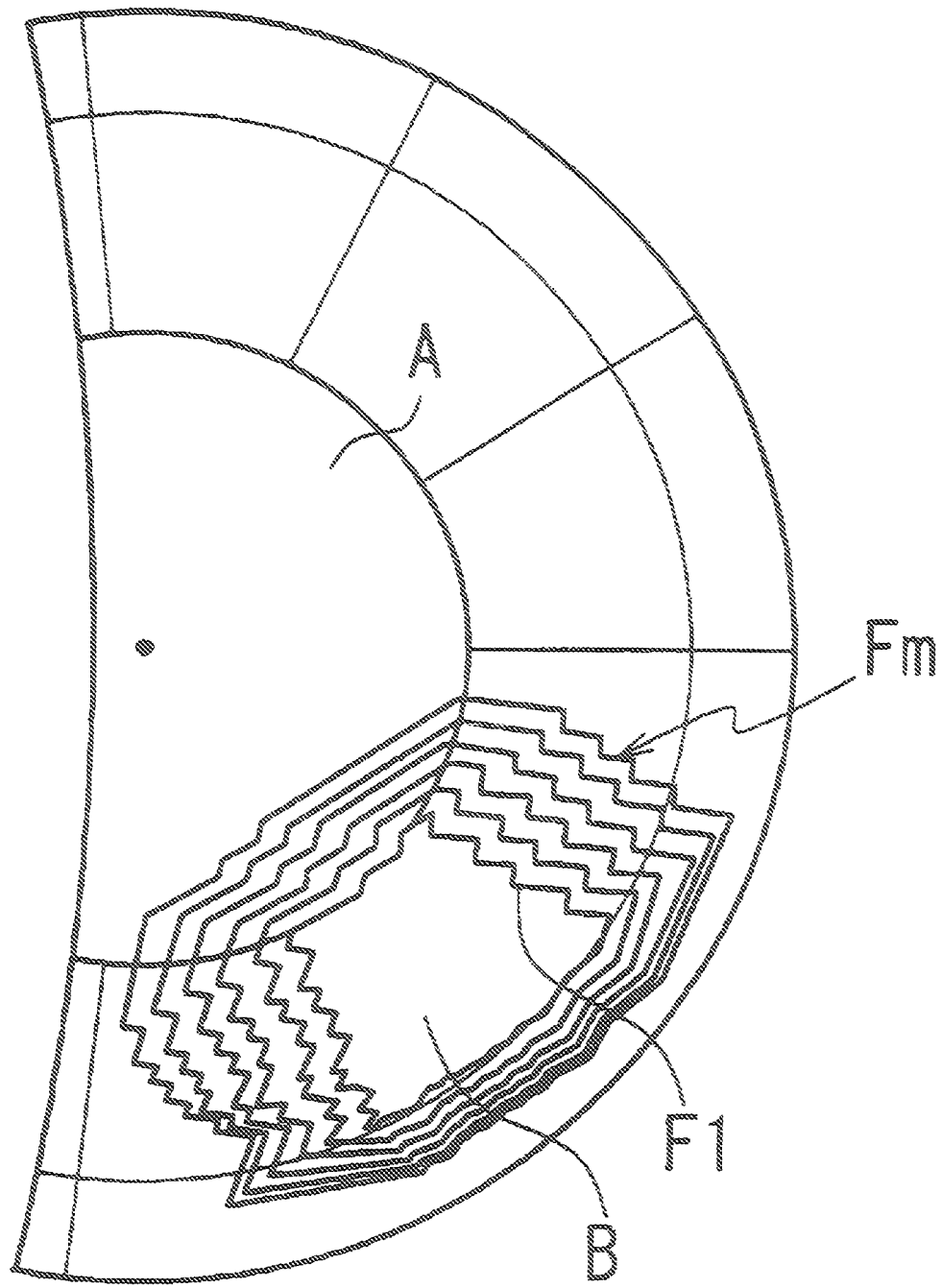
FIG. 3C is an explanatory view showing the concept of dividing the polygon mesh into regions.

When the expansion of the boundary line F is sequentially repeated by the number of times corresponding to the number of the expended lines having been set as the processing tool data, boundary lines Fm multiplexed as shown in FIG. 3C can be obtained.

An overlapped region described later is used to smoothly connect the texture inside the region; however, the number of the expanded boundary lines F is set previously in consideration of the area range of the overlapped region, the characteristics of the texture and the fineness of the polygon mesh.

The innermost side of the boundary lines Fm shown in FIG. 3C is the boundary line F1.

Further, at step 306, the region overlapped with the initial region A and enclosed by the multiplexed boundary lines Fm is set as an overlapped region D.

At step 307, the above-mentioned overlapped region D and the adjacent region B in which the boundary line F0 is searched for are two-dimensionalized by projecting the triangular polygons onto a plane while the median value of the angle range of the adjacent region B given as processing tool data at the time of the region division is used as the normal direction.

The adjacent region B in which the boundary line F0 is searched for is combined with the overlapped region D, and the combined region is also referred to as a "region being processed" X in the sense that the region is an object to be processed for texture mapping.

Figure 18:
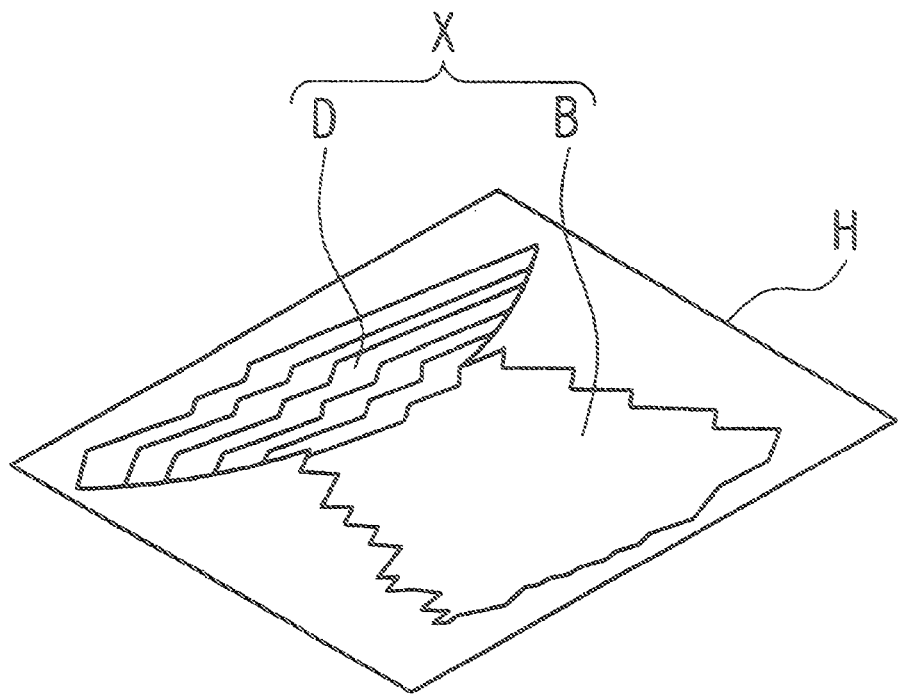
FIG. 18 is an explanatory view showing a procedure of setting a rectangular region.

At step 308, as shown in FIG. 18, a rectangular region H covering the region X being processed on the projecting plane is set as shown in FIG. 18.

At step 309, a texture GB most similar to the overlapped region D in the texture GA mapped in the initial region A is searched for from the texture data by template matching, and then determined and allocated to the rectangular region H.

Figure 19:
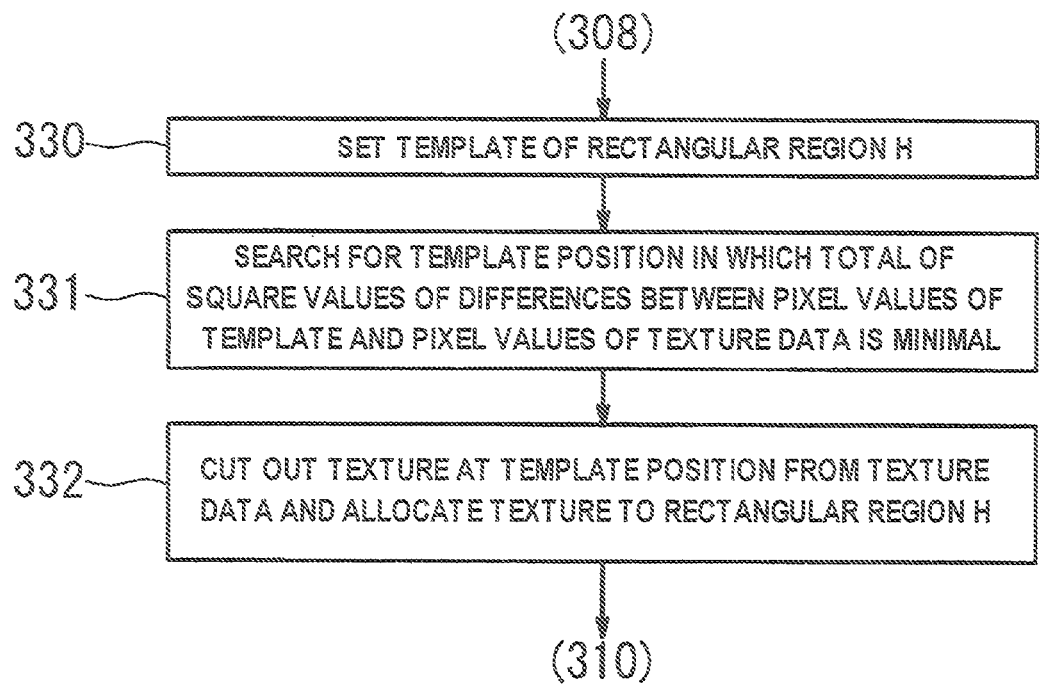
FIG. 19 is a flow chart showing a procedure of extracting the texture most similar to the texture in an overlapped region.

FIG. 19 is a flow chart showing the details of the procedure for extracting the most similar texture GB.

Figure 20A:
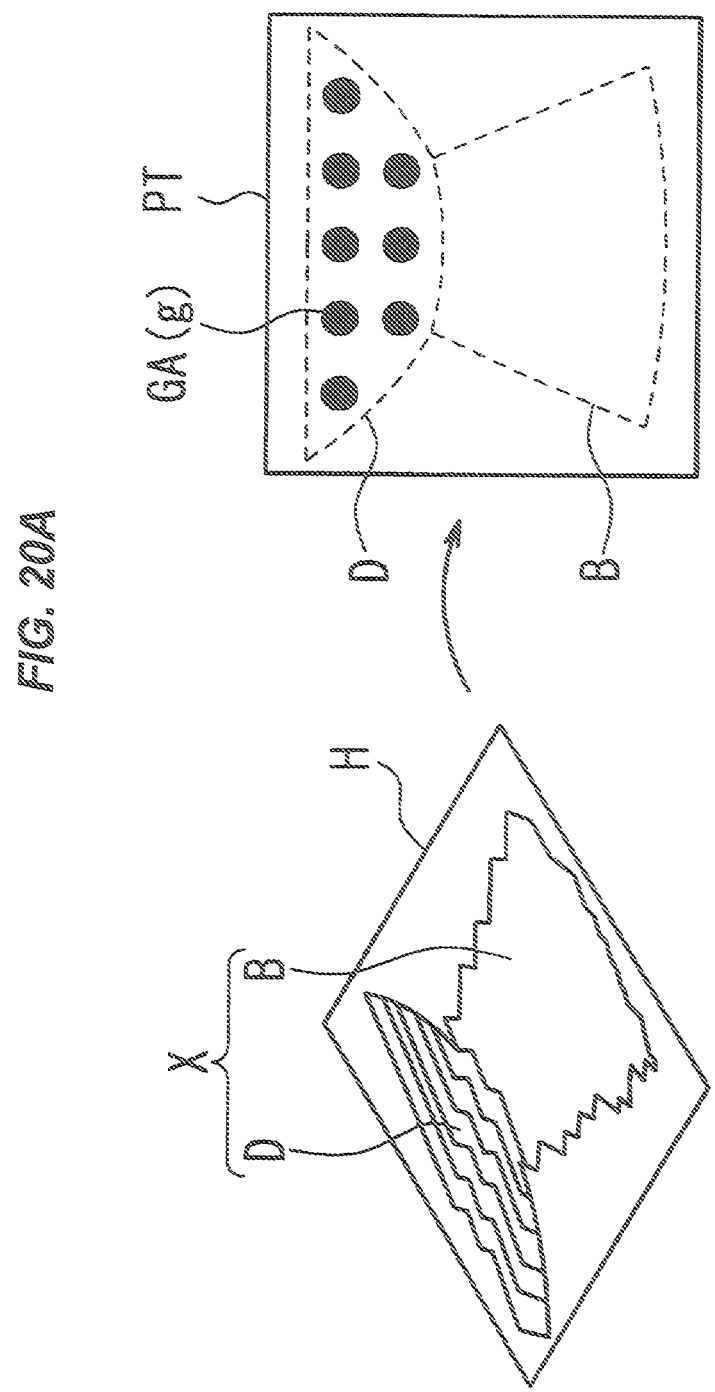
FIG. 20A is an explanatory view showing a template matching procedure.

When it is assumed that the number of the apexes of the initial region A in the overlapped region D is n, the respective apexes have the pixel information of the texture GA. Hence, at step 330, as shown in FIG. 20A, a template PT containing the n pixel values of the overlapped region D and having the same site as that of the rectangular region H is set.

Figure 20B:
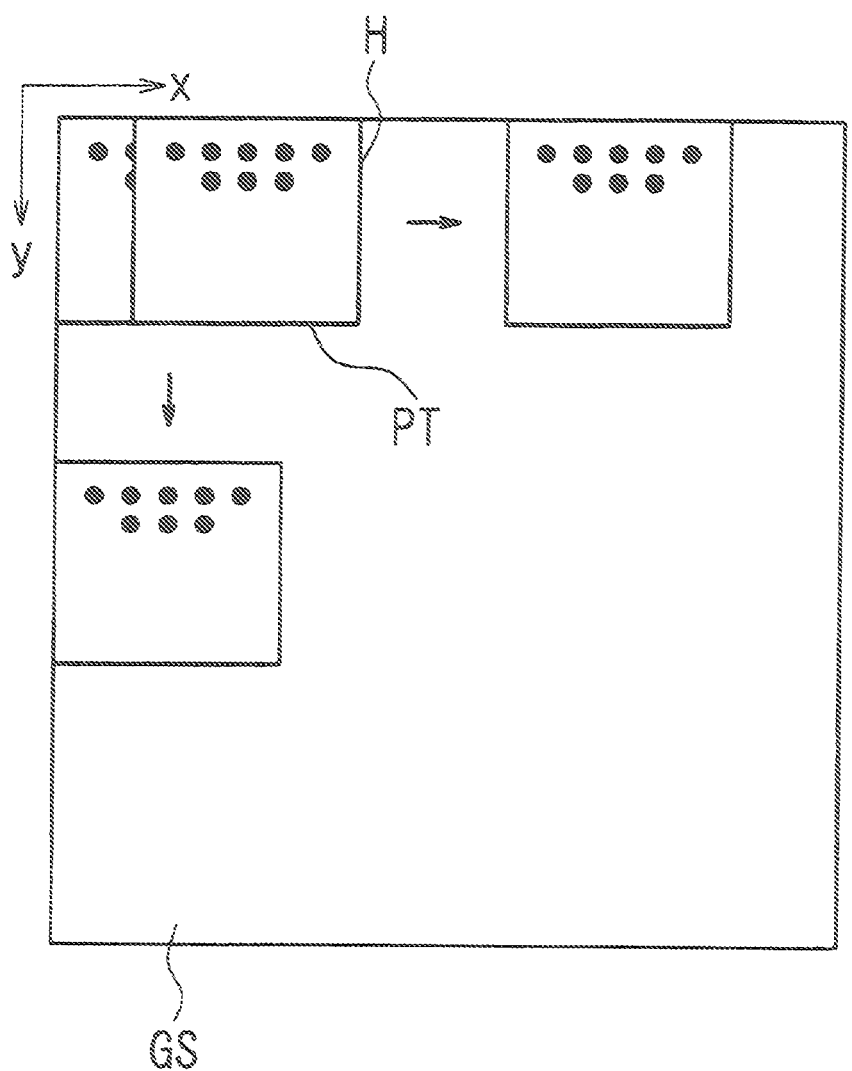
FIG. 20B is an explanatory view showing a template matching procedure.

At step 331, as shown in FIG. 20B, the total of the square values of the differences between the pixel values GA(g) of the apexes inside the template PT and the pixel values GS (g) of the texture date is calculated using the following formula while shifting is performed on the texture data in the x-y direction.

The total of the differences between the pixel values GS(g) inside the texture data and the pixel values GA(g) of the rectangular region H $$=(GS_1(g)-GA_1(g))^2+(GS_2(g)-GA_2(g))^2+\ldots+(GS_n(g)-GA_n(g))^2$$

Then, the position of the template PT in which the total value is minimal is determined.

At step 332, the texture at the position of the template PT in which the total value of the differences between the pixel values GS(g) and the pixel GA(g) is minimal is used as the most similar texture, and the texture GB having an area equivalent to that of the rectangular region H is cut out.

By allocating the size of the rectangular region H to the texture GB, the region X being processed is filled.

Figure 21A:
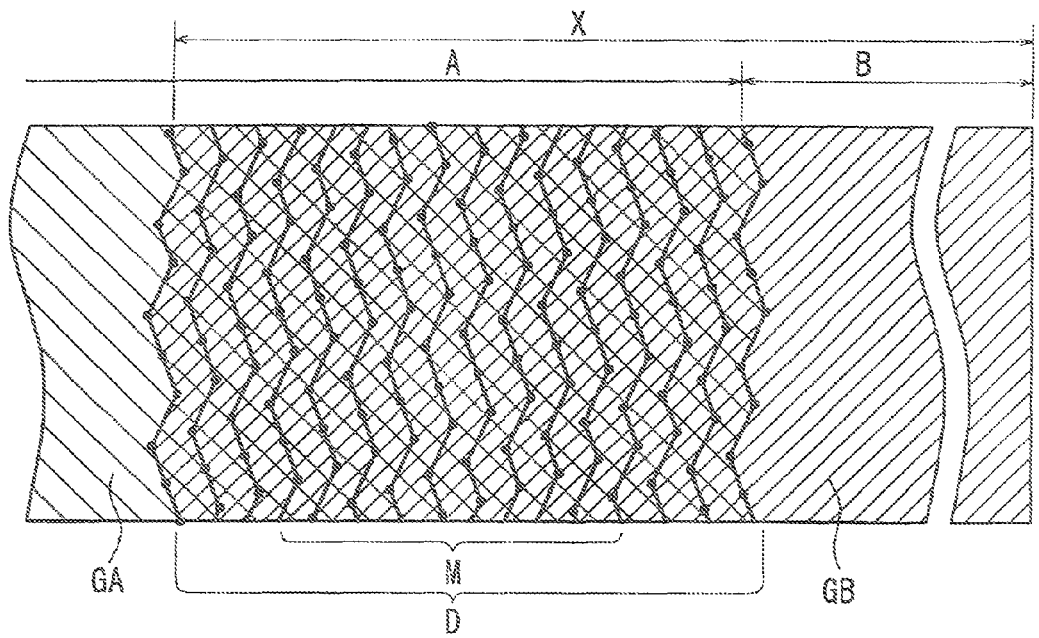
FIG. 21A is an explanatory view showing a procedure of searching for an "optimal boundary line"

As a result, as shown in FIG. 21A, in the overlapped region D, the texture GA mapped in the initial region A is overlapped with the texture GB allocated to the rectangular region H the region X being processed). The polygonal lines in the figure are the multiplexed boundary lines Fm. In the polygon mesh, the apexes are indicated by black circles only on the boundary lines to avoid complicatedness.

Then, the processing returns to the flow charts shown in FIGS. 14 and 15, and at step 310, an "optimal boundary line" FS for smoothly connecting the texture GA in the initial region A to the texture GB allocated to the region X being processed in the overlapped region D is searched for. In other words, image quilting for obtaining the boundary line FS in which the mutual difference between the pixel values becomes minimal is performed.

The search for the optimal boundary line FS is performed by using a middle region in which α boundary lines at both ends of the over lapped region D are excluded as a search region M. The number α of the lines to be excluded from the search is stored as the processing tool data in the input data storage section 12, and the details of which are described later.

Figure 21B:
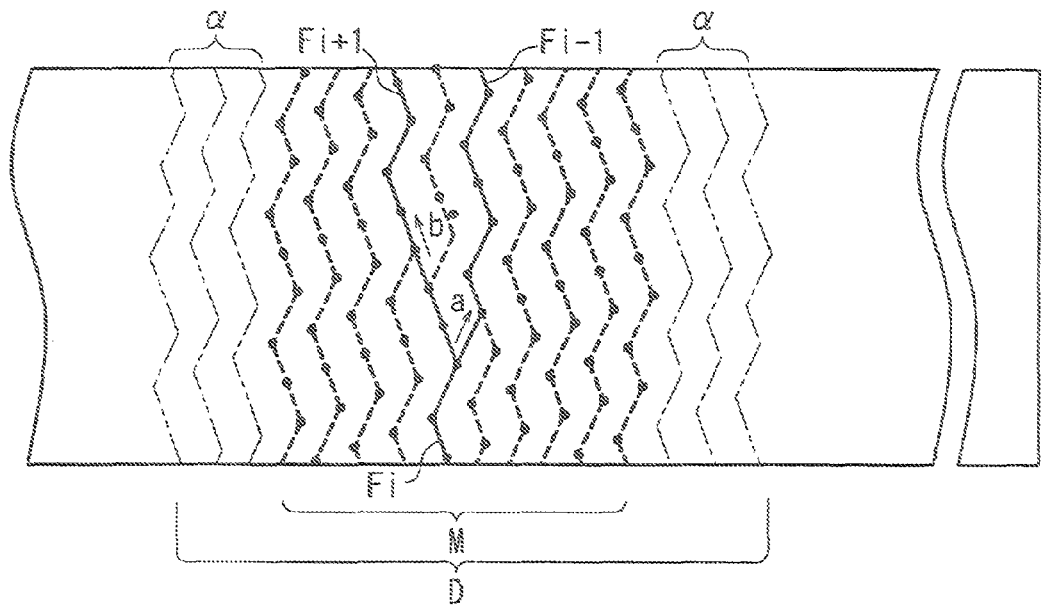
FIG. 21B is an explanatory view showing a procedure of searching for the "optimal boundary line"

At this step, as indicated by solid lines shown in FIG. 21B, while the apexes are followed sequentially from one point on a boundary line in the search region M, in the case that an apex is currently located on the i-th boundary Line Fi, the apex is moved to the next apex on the same boundary line or to the apex having the smallest difference between the pixel values among the apexes on the inner (i−1)th boundary line Fi−1 or on the outer (i+1)th boundary line Fi+1 under the condition that the angle of the advance direction on the projecting plane is not returned to 90°, for example. The arrow a in FIG. 21B indicates an example in which the movement is performed from an apex on the boundary line Fi to an apex on the boundary line Fi−1, and the arrow b indicates an example in which the movement is performed from an apex on the boundary line Fi to an apex on the boundary line Fi+1.

The search is started from all the boundary lines of the search region M, and the boundary line having the smallest difference between the pixel values in the entire passage is used as the optimal boundary line FS.

The pixel value of an apex position is calculated by performing bilinear interpolation on the basis of the pixel values of the four pixels therearound.

In addition, in a region (the adjacent region B) in which texture mapping is not yet performed, the difference between the pixel values is set to 0 (zero), and the boundary line at the current position is followed.

By the use of the optimal boundary line FS obtained as described above, as exemplified in FIG. 21C, the end of the texture GB to be mapped in the region X being processed on the side of the initial region A is partitioned, and the texture GB is connected to the texture GA in the initial region on the optimal boundary line FS, whereby the two textures can be connected smoothly while the change in pixel value is small.

In other words, a new texture is connected to an existing texture while the difference between the pixel values of the texture of the initial region A and those of the new texture (that is, the texture allocated to the region X being processed) has the minimal level change.

In this embodiment, instead of connecting the texture GB and the texture GA on the optimal boundary line FS in a state of being abutted to each other, the pixel values of the textures GA and GB are weighted depending on the distance from the optimal boundary line FS and mixed on both sides in which the optimal boundary line FS is used as the center at step 311 so that the regions GA and GB adjacent to each other are connected further smoothly.

At this step, as shown in FIG. 22, the objects to be mixed are assumed to be the pixel values of the apexes located in the range of Lmax on on each of both sides of the optimal boundary line FS. On the optimal boundary line FS, the pixel values GA(g) of the texture GA and the pixel values GB(g) of the texture GB respectively account for 50%; on the side of the adjacent region B from the optimal boundary line F, as the distance from the optimal boundary line FS is larger, the ratio of the pixel values GA(g) is decreased and the ratio of the pixel values GB(g) is increased, and at the apexes at the Lmax positions, the ratio of the pixel values GA(g) is set to 0 and the ratio of the pixel values GB(g) is set to 100%.

On the other hand, on the side of the initial region A from the optimal boundary line FS, as the distance from the optimal boundary line FS is larger, the ratio of the pixel values GA(g) is increased and the ratio of the pixel values GB(g) is decreased, and at the apexes at the Lmax positions, the ratio of the pixel values GA(g) is set to set to 100% and the ratio of the pixel values GB(g) is set to set 0.

In other words, the pixel value GR at each apex after the mixing is represented by the following formula wherein the distance from the optimal boundary line is L and the direction opposite to the adjacent region B from the optimal boundary line is plus (+).

$$GR(g)=GA(g)(L\max+L)2L\max+GB(g)(L\max-L)/2L\max$$

As the distance L of an apex from the optimal boundary line, the shortest distance from the apex to the optimal boundary line is used.

Furthermore, the search for the optimal boundary line FS is limited in the search region M in which α boundary lines to be excluded at both ends of the overlapped region are excluded to avoid a case in which the mixing cannot be performed from occurring because in the case that the optimal boundary line FS is used as the boundary line on the outermost side (the initial region side) of the overlapped region, the texture GB is not allocated to the side of the initial region from the optimal boundary line FS.

For this reason, even when the optimal boundary line FS passes through the apex on the boundary line at the outermost end por tion of the search region M, the apex located in the range of Lmax from the optimal boundary line FS is positioned inside the overlapped region to which the texture GB is allocated so that the mixing of pixel values can be performed. Hence, it is desirable that the number α of the lines to be excluded from the search should be set to the number of the boundary lines capable of covering the distance of Lmax plus a slight margin.

Similarly, the number α of the lines to be excluded from the search is set on the side of the adjacent region inside the overlapped region so that the mixing of pixel values inside the overlapped region can be performed.

At step 312, the above-mentioned texture in which the pixel values are mixed inside the overlapped region D is mapped in the region X being processed.

As a result, the texture GA of the initial region A is further smoothly connected to the texture GB mapped in the region X being processed in the range of 2Lmax in which the optimal boundary line is used as the center.

At step 313, a check is performed to determine whether texture mapping has been completed for all the divided regions.

In the case that unprocessed regions remain, the initial region A is integrated with the region X being processed so as to become a new initial region and the IDs of the triangular polygons are reset at step 314; then the processing returns to step 303, and the processing up to step 312 is repeated.

In the case of performing texture synthesis in the patch unit mode described above, the size to be cut out from the texture data is large; hence, this is advantageous in that the characteristics of the grain indicated by the texture data input to the data input section 11 can be maintained faithfully and in that the calculation time required for the processing is not required to be long.

After texture mapping for all the regions is completed, the processing advances to step 105.

On the other hand, at step 320 branched from step 302, template matching is performed at the boundary portion between the region (the initial region A at the start) having already been subjected to texture mapping and having pixel values and the region (the adjacent region B) having no pixel value, and pixels capable of being smoothly connected to the region already having pixel values with the smallest change are extracted from the texture data and mapped for respective apexes in the region having no pixel value.

Figure 23:
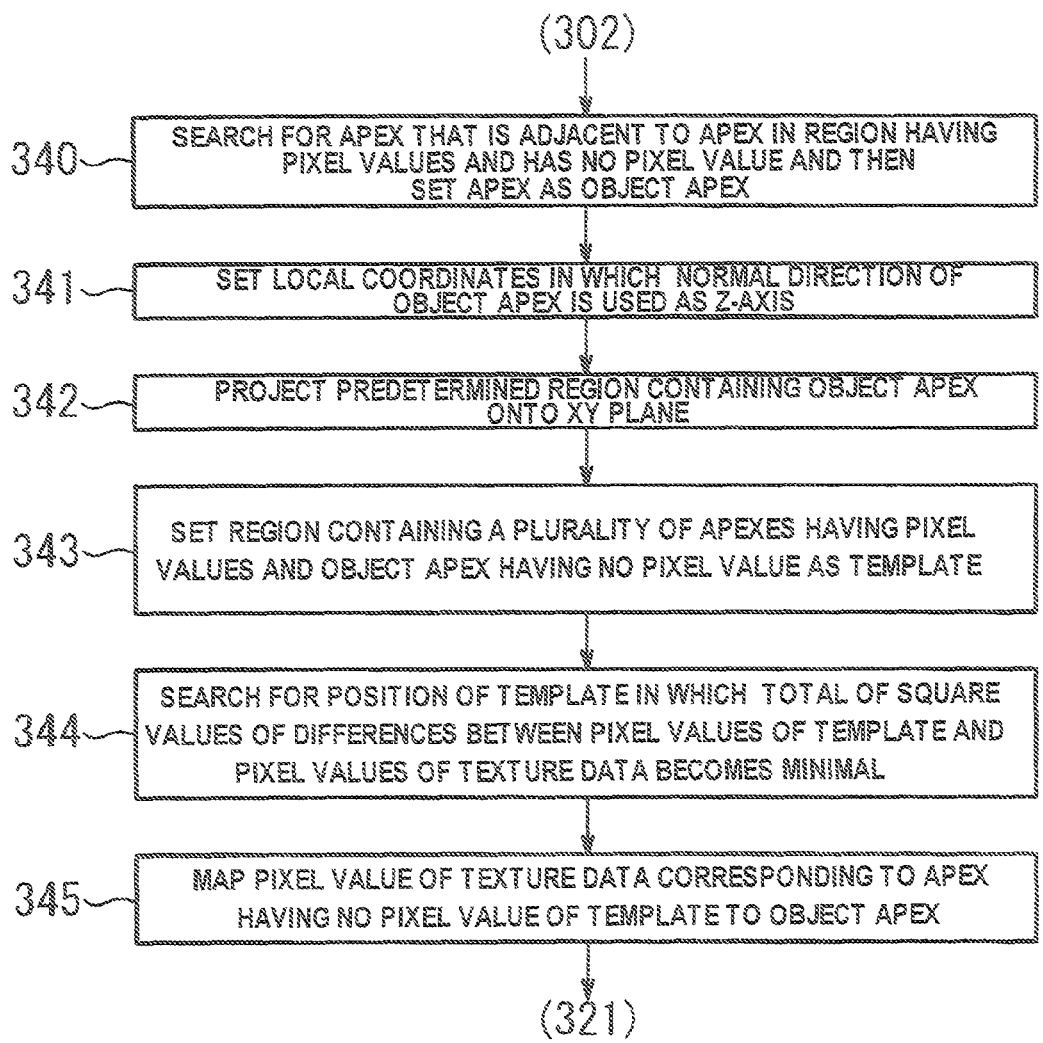
FIG. 23 is a flow chart showing a mapping process in pixel unit.

FIG. 23 is a flow chart showing the details of mapping in the pixel unit described above.

First, at step 340, an apex that is adjacent to an apex in a region having pixel values and has no pixel value is searched for, and this apex is set as an object apex pgb in which a pixel value is determined.

Figure 24A:
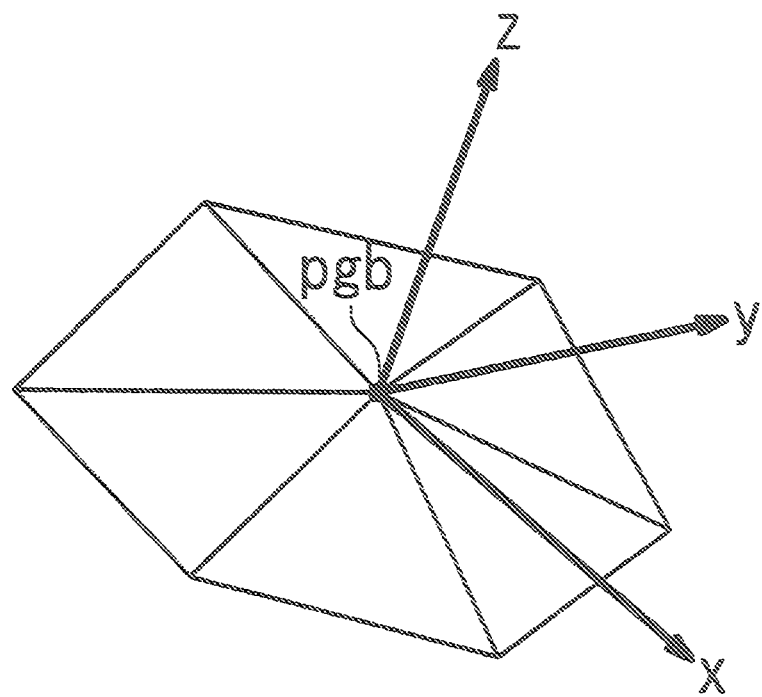
FIG. 24A is a view showing a local coordinate system that is set at an object apex in which a pixel value is determined.
Figure 24B:
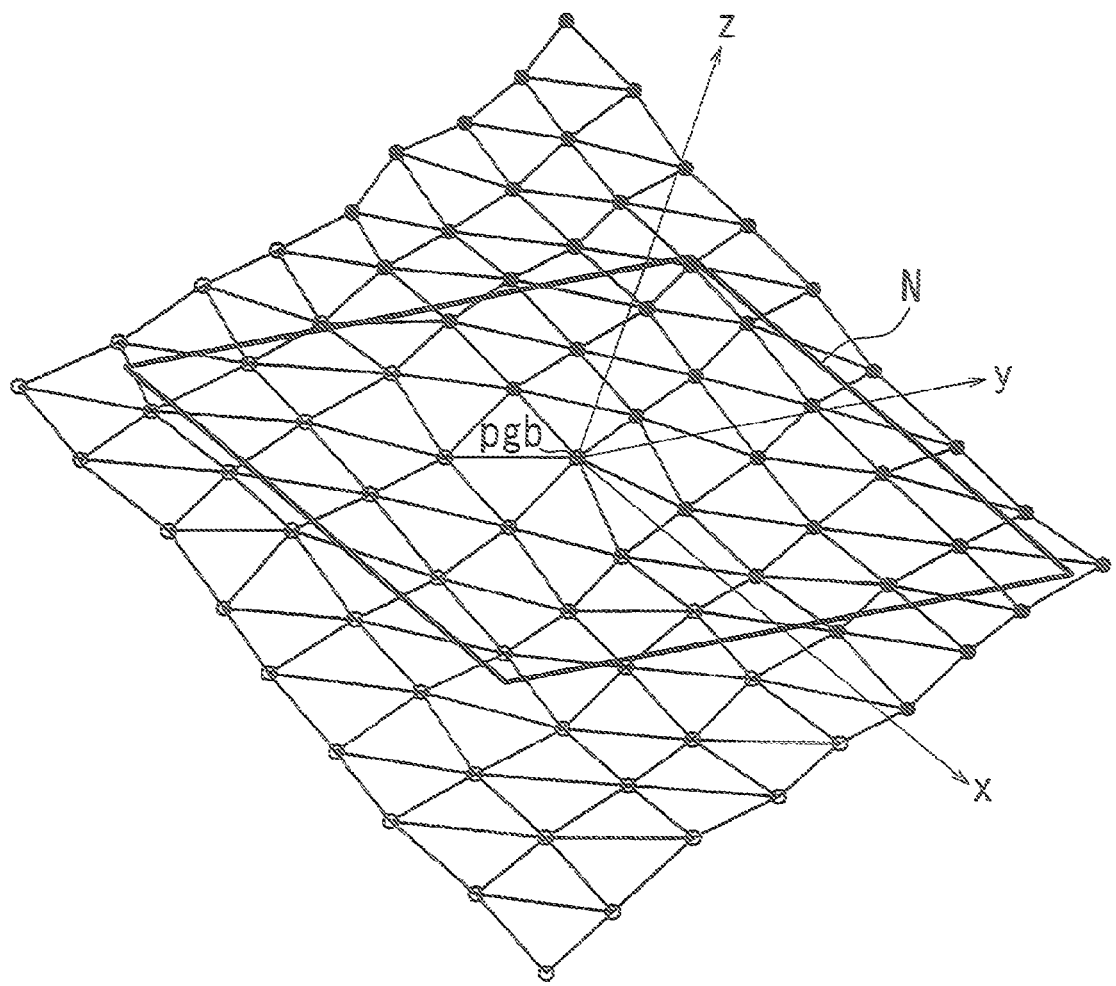
FIG. 24B is a view showing a local coordinate system that is set at the object apex in which the pixel value is determined.

Then, at step 341, as shown in FIG. 24A, local coordinates in which the normal direction at the apex obtained from the polygon adjacent to the object apex pgb is used as the Z-coordinate axis are set, and at step 342, as shown in FIG. 24B, a predetermined region N containing the object apex pgb and ranging 1 mm in the x direction and 1 in the y direction, for example, is projected onto the xy plane of the local coordinates, thereby two-dimensionalized.

The apexes to be projected are all the apexes in the range designated by searching for the apexes around the object apex pgb in the order of a first layer (apexes connected using one edge line), a second layer (apexes connected using tone edge lines) and a third layer.

In a three-dimensional mesh, the apexes are not necessarily arranged regularly; hence, for the purpose of obtaining a proper texture, it is necessary to project an apex position onto the xy plane of the local coordinates as described above and to determine the pixel value at the position.

The pixel value GA(g) of the apex is obtained by performing bilinear interpolation on the basis of the pixel values of the four pixels around the position projected onto the xy plane.

Figure 25A:
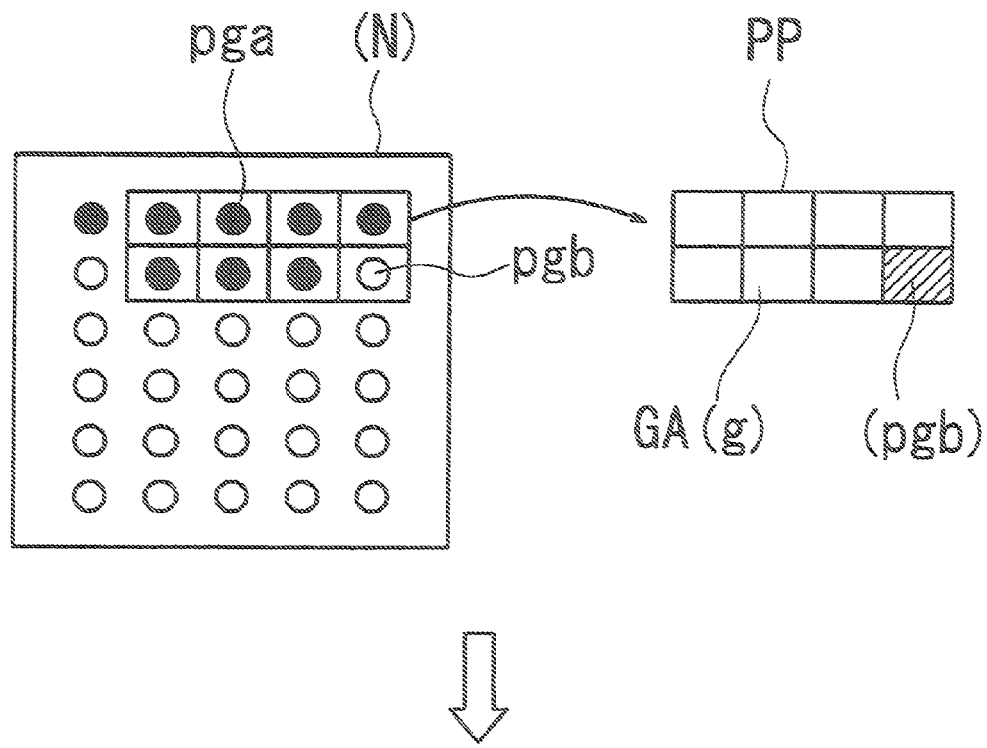
FIG. 25A is an explanatory view showing a template matching procedure.

At step 343, as schematically shown in FIG. 25A, a region containing a plurality of apexes pga having pixel values and the object apex pgb having no preset pixel value is set as a template PP.

Figure 25B:
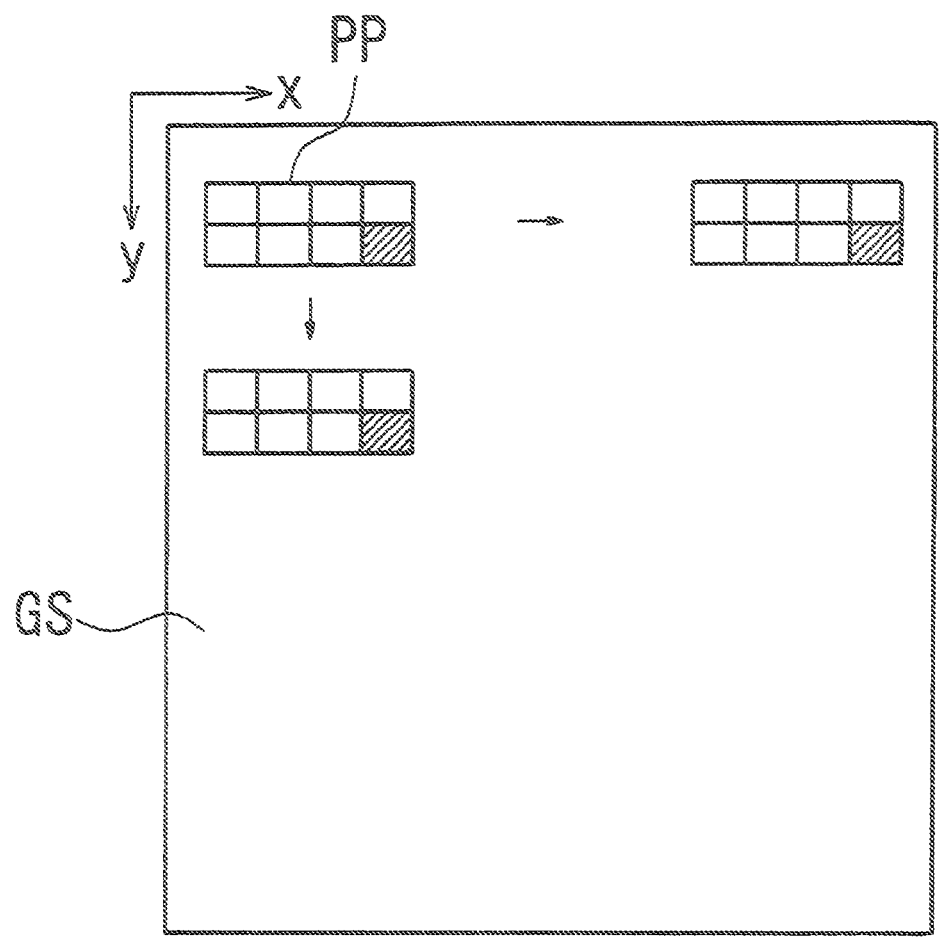
FIG. 25B is as explanatory view showing a template matching procedure.

In FIGS. 24A to 25B, a black circle indicates an apex pga having a pixel value, and a white circle indicates an apex having no pixel value; in particular, the white circle in the region of the template PP is the object apex pgb in which a pixel value is determined. The positions of the apexes shown in FIGS. 25A and 25B are shown schematically and are thus not aligned with those shown in FIG. 24B.

Furthermore, in the template PP, the pixel value of the apex pga is indicated by blank, and the object apex portion having no pixel value is indicated by hatching.

The position of the object apex pgb inside the template PP is input previously as processing tool together with the site of the template; the position can also be input arbitrarily before the processing.

At step 344, as shown in FIG. 25B, the total of the square values of the differences between the pixel values GB(g) of the apexes inside the template PP and the pixel values GS(g) of the texture data is calculated while shifting is performed in the x-y direction on the texture data, and the position of the template PP having the minimal total value it searched for.

The procedure for calculating the total value is similar to that performed for the extraction of the texture GB most similar to the texture GA of the overlapped region D at step 309.

Then, at step 345, at the position of the template PP having the minimal total value of the square values of the differences between the pixel values GS(g) and the pixel values GS(g), the pixel value GS(g) calculated by performing bilinear interpolation on the basis of the pixel values of the four pixels located around the texture data and at the position corresponding to the apex having no pixel value is mapped at the object apex pgb.

As a result, a new texture is connected to existing textures while the level is changed so that the total of the square values of the differences between the pixel values around the object apex and the pixel values of the texture data becomes minimal.

Returning to the flow chart shown in FIG. 15, at step 321, a check is performed to determine whether apexes having no pixel value remain in the integrated polygon mesh QT.

In the case that apexes having no pixel value remain, the processing returns to step 320, and the extraction of pixel values in pixel unit and mapping are repeated. This repetition process is repeated until apexes having no pixel value do not remain in the entire surface of the polygon mesh. This should only be performed sequentially for the respective regions in the order of the ID numbers, the regions being obtained by dividing the integrated polygon mesh.

At this time, the apex pgb in which an apex value is mapped at step 320 is changed to the apex pga having an apex value at the next process as a matter of course.

In the case that texture synthesis is performed in the pixel unit mode as described above, since the synthesis is performed in pixel unit, no distortion takes place and no discontinuous portion occurs, whereby smooth change can be obtained accurately. Hence, this is advantageous in that the expansion of boundary lines and the mixing of pixel values, for example, are unnecessary.

After the mapping of the pixel values for all the apexes of the polygon mesh is completed, the processing advances to stop 105.

Next, the details of giving a grain shape to a three-dimensional polygon mesh (the integrated polygon mesh QT) by the displacement mapping at step 105 in the flow chart shown an FIG. 2 will be described.

A carved surface p' to be displaced by displacement mapping is represented by formula (1).

$$p'(u,v)=p(u,v)+h(u,v)g(u,v) \quad (1)$$

Figure 26:
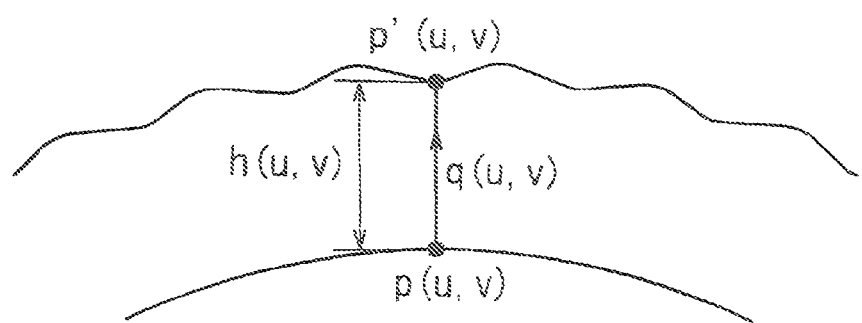
FIG. 26 is an explanatory view showing the concept of displacement mapping.

At this step, as shown in FIG. 26, p(u, v) represents a curved surface (basic curved surface) before displacement, h(u, v) represents a displacement amount, and q(u, v) represents a unit vector in the displacement direction.

Hence, each apex pc located as p(u, v) in the polygon mesh QT is herein displaced according to the above-mentioned formula.

Figure 27:
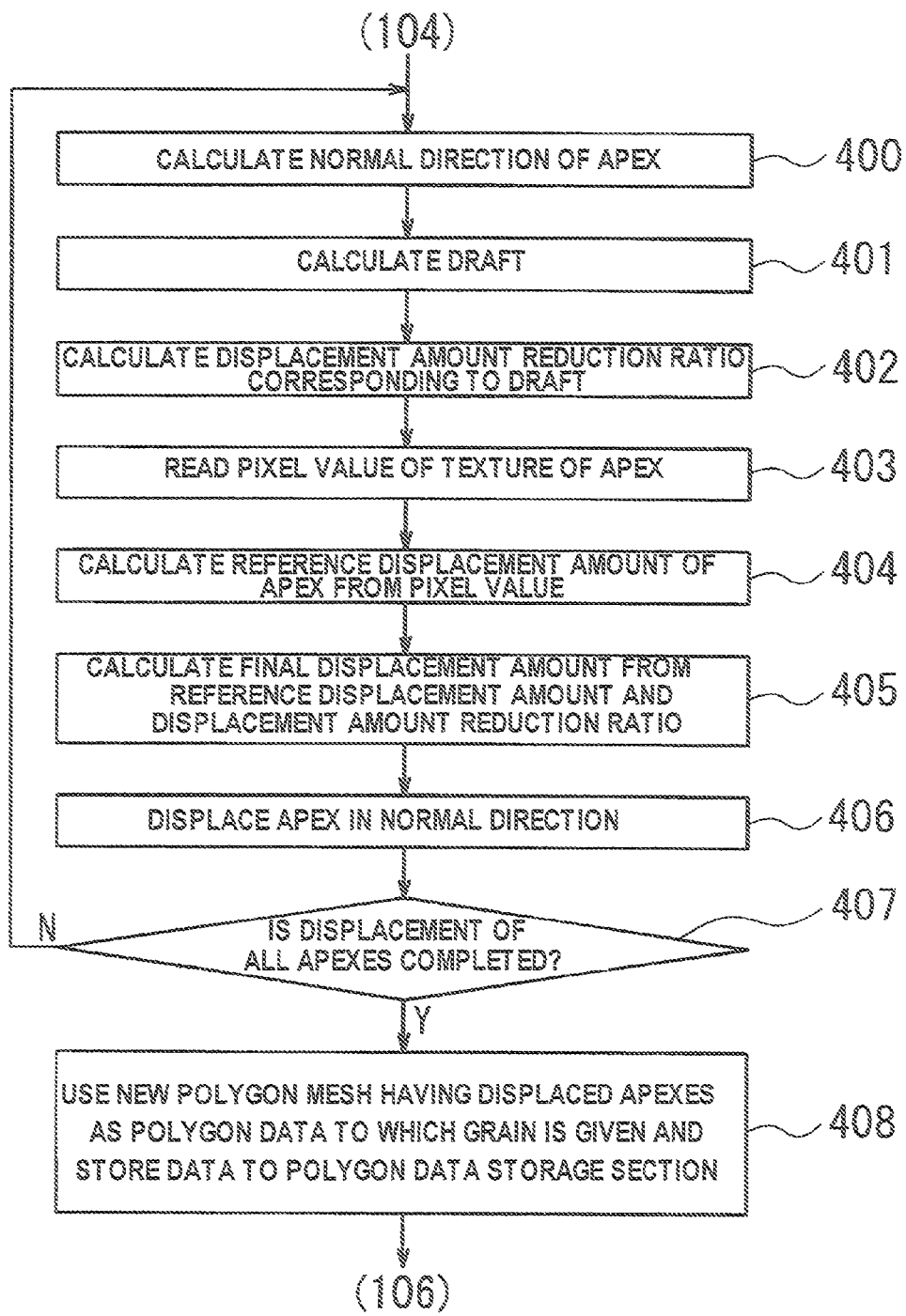
FIG. 27 is a flow chart showing the details of giving a grain shape.

FIG. 27 is a flow chart showing the details of giving a grain shape in the grain generating section 32 at step 105.

First, at step 400, one of the apexes pc of the integrated polygon mesh QT is selected and the normal direction of the apes pc is calculated. The position of the apex to be selected is arbitrary.

The normal direction may be obtained from a free-form surface using the parameter value of the apex pc or can be obtained as the average in the normal directions of the polygons around the apex pc.

This normal direction becomes a unit vector q that is used when the apex is displaced and when a draft is calculated later.

Next, at step 401, a draft is calculated on the basis of the mold opening direction of a metal mold to be treated and the normal direction of the coordinates of an apex, these being previously set and stored in the input data storage section 12.

Then, at step 402, on the basis of the change formula of the grain depth corresponding to the draft selected at the start time of the processing, the displacement amount reduction ratio at the apes position is obtained.

Figure 28:
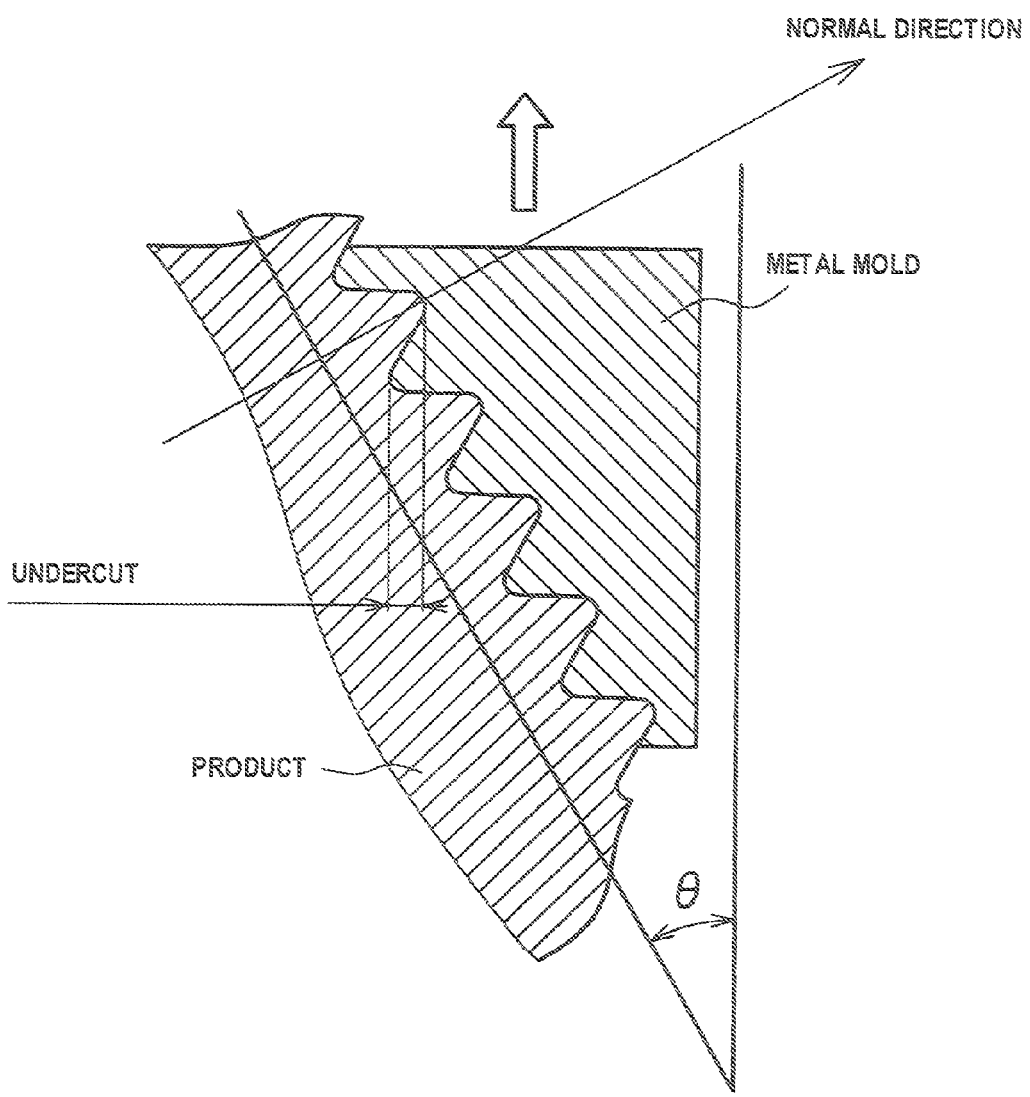
FIG. 28 is an explanatory view showing interference between a metal mold and a product depending on a draft.
Figure 29:
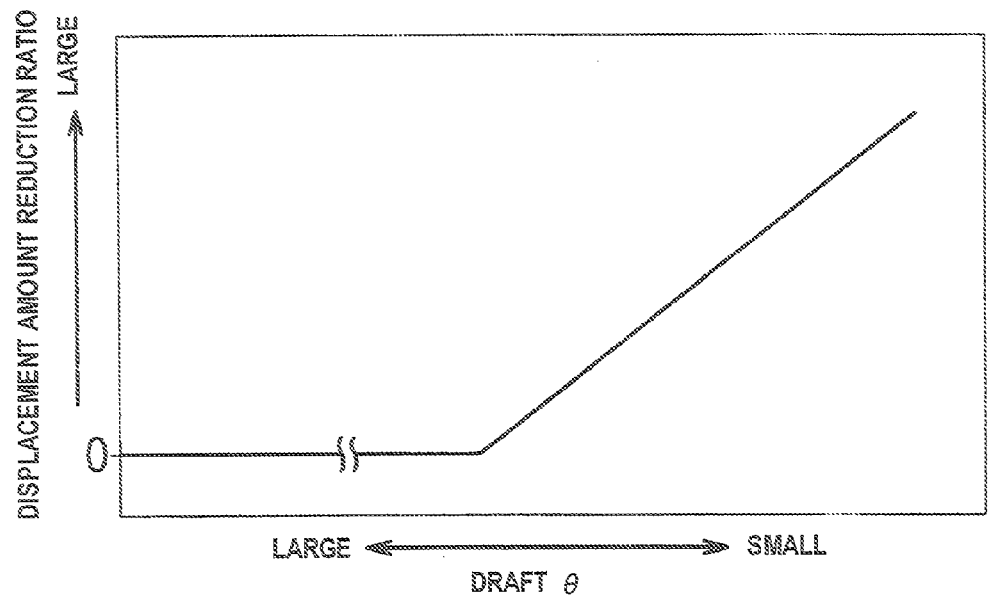
FIG. 29 is a view showing the relationship between the draft and a displacement amount reduction ratio, also showing the concept of a change formula.

As shown in FIG. 28, when it is assumed that the draft formed by the direction being 90 degrees with respect to the normal direction of the apex and the mold opening direction indicated by the hollow arrow is an angle θ, as the draft is smaller, a larger undercut occurs, whereby the metal mold interferes with the grain on the side of the product at the time of mold opening. Hence, the change formula is set so that as the draft θ is smaller, the displacement amount reduction ratio becomes larger (that is, the displacement amount becomes smaller) as shown in FIG. 29. At this time, the change formula is determined by additionally considering that the degree of the actual interference between the metal mold and the product is slightly relieved by the shrinkage of resin after molding. The displacement amount reduction ratio changes continuously depending on the draft.

At step 403, a pixel value (density) g is read from the apex information stored in the working memory.

At step 404, the reference displacement amount of the apex is obtained on the basis of the conversion rate between the pixel value g and the depth of the grain.

When it is assumed than the maximum depth of the grain, that is, the maximum displacement amount, is $h_{max}$, the conversion rate becomes $h_{max}/255$, and the reference displacement amount h is represented by formula (2) using the pixel value g.

$$h = (g/255) h_{max} \quad (2)$$

For example, in the case that the pixel value g is 128 when $h_{max}$ is 300 μm, the reference displacement amount $\underline{h}$ becomes 150 μm.

At step 405, the final displacement amount is calculated by multiplying the reference displacement amount $\underline{h}$ by the displacement amount reduction ratio.

Hence, for example, when the reference displacement amount h is 200 μm, if the draft is larger than 25°, the displacement amount reduction ratio is set to 0% and the final displacement amount hf remains 200 μm; if the draft is in the range of 0° to 25°, the displacement amount reduction ratio is set to 90 to 0% and the final displacement amount hf can be changed from 20 μm to 200 μm.

At step 406, the apex pc of the polygon mesh QT is displaced according to the above-mentioned formula (1) by setting the final displacement amount hf obtained as described above to h(u, v) and by using the unit vector q (normal direction).

Next, at step 407, a check is performed to determine whether apexes having not been subjected to the above-mentioned process remain.

In the case that apexes having not been subjected to the process remain, the processing returns to step 400 and the processing up to step 406 is repeated.

When the displacement in the normal direction on the basis of the texture data is completed for all the apexes, the processing advances from step 407 to step 408, and the respective apexes pc at displaced new positions are connected, whereby polygon data to which the grain shape is given is formed. This polygon data is stored in the polygon data storage section 19.

Figure 30:
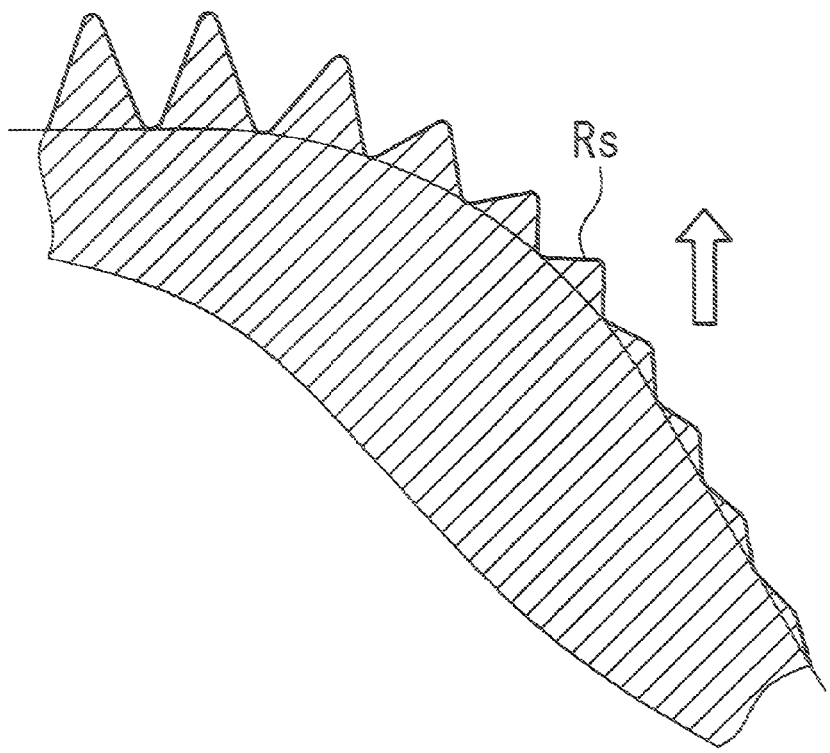
FIG. 30 is a view showing the change in the depth of a grain in case that displacement amount reduction is applied.

By the use of the polygon data, no undercut occurs between the metal mold and the product because of the above-mentioned reduction in the displacement amount at portions having small drafts; hence, a product, the depth (height) or the grain Rs of which changes continuously, is obtained as shown in FIG. 30. In the figure, the hollow arrow indicates the mold opening direction.

The process for forming grain-given polygon data is completed as described above.

Since the patch unit mode and the pixel unit mode are provided for texture synthesis in this embodiment, in the case that the patch unit mode is selected for example, after a series of processes, through the operation of operation input section 22, the polygon data is read from the polygon data storage section 10 and displayed on the monitor 23 and confirmed.

In the case that the texture is allocated in patch unit as described above, the characteristics of the grain indicated by the texture data input to the data input section 11 can be maintained faithfully, thereby being advantageous in that the calculation time for the process is not required to be long. On the of other hand, a discontinuous portion is apt to occur in the boundary portion of each divided region; hence, in the case that a discontinuous portion that in difficult to allow for remains even after the image quilting that was used in the patch unit mode as a result confirmed using the monitor, grain-given polygon data having no discontinuous portion can be obtained by selecting the pixel unit mode, although the processing time extends.

In this embodiment, steps 100 to 102 in the flow chart shown in FIG. 2 constitute a polygon meshing section and step 103 corresponds to a polygon mesh region dividing section in the present invention.

Steps 300 to 314 in the flow charts shown in FIGS. 14 and 15 constitute a texture synthesizing/mapping section in the present invention according to claim 24; in particular, steps 303 to 306 constitute an overlapped region setting section, steps 307 and 308 constitute a rectangular region setting section, step 309 constitutes a texture allocating section, and step 310 constitutes an optimal boundary line searching section. Steps 311 and 312 constitute an image quilting section, and steps 313 and 314 constitute an initial region resetting section.

In addition, mapping is performed in the region X being processed, and the texture GB "connected to the texture GA mapped in the initial region A at the "optimal boundary line" FS wherein the difference in pixel value becomes minimal" corresponds to a new texture "connected with a change satisfying a predetermined request level" according to the present invention.

Furthermore, steps 300 to 302, 320 and 321 constitute a texture synthesizing/mapping section in the present invention according to claim 25; in particular, step 340 in the flow chart shown in FIG. 23 constitutes an object apex searching section, steps 341 to 343 constitute a template setting section, step 344 constitutes a template position searching section, and step 345 constitutes a texture mapping section.

The pixel value of the texture data corresponds to the object apex "at the template position in which the total of the square values of the differences between the pixel values GA(g) at the apexes inside the temperature PP containing the object apex and the pixel valves GS(g) of the texture data becomes minimal" corresponds to a new texture "connected with a change satisfying a predetermined request level" according to the present invention.

Steps 400 to 407 of the flow chart shown in FIG. 27 constitute an apex displacing section, and step 408 constitutes a grain-given polygon mesh forming section.

The embodiment is configured as described above; first, the product shape data defined on the free-form surface input to the data input section 11 is converted into a polygon mash, and one region obtained by dividing this is used as the initial region A, and the texture GA cut out from the texture data of the sample input to the data input section 11 is mapped. Then, the new texture GB is synthesized so as to be connected to the mapped texture GA with a smooth change, and mapping of the texture GB in adjacent regions having no texture value is repeated, thereby mapping the texture in all the regions of the polygon mesh. Furthermore, the respective apexes of the polygon mesh QT are displaced in the respective normal directions on the basis of the mapped texture, and new polygon mesh data formed by connecting the displaced respective apexes is used as surface processing data to which a grain is given.

In the above-mentioned embodiment, the product shape data is converted into a polygon mesh and then processed as curved surface data having no thickness, whereby the amount of data to be processed can be made small.

Moreover, since the synthesis of the new texture is advanced in each region obtained by minutely dividing the entire surface of the product, even in the case of a product shape whose surface cannot be developed, a good-looking grain with few distortions can be given, and as texture data to be input to the data input section 11, a relatively small size of sample data should only be prepared.

In particular, in the case of the synthesis of a new texture in the patch unit mode, the overlapped region D is set between the initial region A and the adjacent region B, and in this overlapped region D, synthesis is performed using textures in patch unit prepared so as to have the size of the rectangular region H, and mapping is performed in the region X being processed that is formed of the overlapped region D and the adjacent region B. Then, the following process in which the region X being processed to which the mapping is performed and the initial region A are reset as a new initial region and the overlapped region D is set is repeated, whereby texture mapping is performed in all the regions of the polygon mesh.

Since a relatively considerable amount of textures having the size of the rectangular region H is connected, the characteristics of the grain represented by the texture data input to the data input section 11 can be maintained faithfully, and the calculation time for the processing is not required to be long.

For the setting of the overlapped region D, the boundary line F of the adjacent region B is searched for as the line for connecting the apexes of the polygon mesh, the boundary line F is expanded on the outer side of the adjacent region B and multiplexed, and the region in which these multiplexed boundary lines F1, F2, F3, . . . are overlapped with the initial region A is used as the overlapped region D. Hence, it is easy to variously set the size of the overlapped region D by increasing/decreasing the number of the multiplexed boundary lines F.

In the polygons in each divided region, an ID is allocated to each region to which the polygons belong; hence, the search for the above-mentioned boundary line F can be performed efficiently by referring to the ID.

Furthermore, in the case that the two continuous edge lines of the boundary line F0 before multiplication are the two sides of one triangle, the smooth boundary line F1 is obtained by replacing the two sides with one edge line of the remaining one side of the triangle, whereby the multiplication processing is performed simply.

Since the division of the polygon mesh QT into regions is performed by dividing the polygon mesh in a predetermined angle range calculated using a predetermined reference axis and the normal direction of the polygon mesh, the accuracy at the time of texture mapping can be controlled by properly selecting the angle range.

The multiplication of the boundary line F is performed by following the apexes on the boundary line F1 to obtain the apexes of the other ends of the edge lines connected to the respective apexes, sequentially connecting the apexes of the other ends, setting a new boundary line on the outside of the boundary line F1, and sequentially repeating this process to obtain a plurality of expanded boundary lines F2, F3, . . . . Hence, the multiplication of the boundary line F can be attained easily at intervals of triangle unit constituting the polygon mesh.

The synthesis of a new texture in patch unit is performed by projecting the region X being processed onto a two-dimensional plane, setting the rectangular region H covering the region X being processed on the projecting plane, allocating the new texture GB to the rectangular region, and obtaining the optimal boundary line FS in which the difference between the pixel values of the texture GA mapped on the initial region A and the pixel values of the new texture GB becomes minimal in the overlapped region D.

At this time, the texture most similar to the overlapped region D of the texture GA mapped in the initial region A is cut out from the sample texture data containing the texture GA mapped in the initial region A and then used as the new texture GB to be allocated to the rectangular region H; hence, an absolutely small value is obtained as the minimum value of the difference in pixel value, whereby the optimal boundary line FS in which the deviation between the textures GA and GB is particularly small is obtained.

The optimal boundary line FS is obtained by following one boundary line of the multiplexed boundary lines Fm and by the movement from the current apex to the next apex on the boundary line or to the apex in which the difference in pixel value is minimal among the apexes on the inside boundary line or the outside boundary line being adjacent under the condition that the advance direction is not reversed, whereby search is made easy.

Furthermore, the search for the optimal boundary line FS is limited to the search region M in which α boundary lines at both ends of the overlapped region D are excluded; hence even in the case that the outermost end portion of the search region becomes the optimal boundary line FS, the predetermined range 2Lmax in which the optimal boundary line is used as the center can be obtained securely. The texture value of the texture GA mapped in the initial region A in the predetermined range 2Lmax and the texture value of the new texture GB allocated to the rectangular region H can be weighted depending on the distance from the optimal boundary line FS and can be mixed, whereby texture change from the initial region A to the adjacent region B is made particularly smoothly.

The synthesis of a new texture in pixel unit is performed as described below. First, an apex having no pixel value and adjacent to an apex having a pixel value in a region is searched for, the apex is set as the object apex in which the pixel value is determined, the predetermined range containing the object apex is projected onto a two-dimensional plane, and a template containing the object apex and a plurality of apexes adjacent to the object apex and having texture values is set on the projecting plane. Then, the position of the template in which the difference between the texture data and the texture value of the template becomes minimal is searched for, and the texture value of the texture data corresponding to the position of the object apex inside the template at the position of the template having been searched for is mapped at the above-mentioned object apex. Hence, a new texture chat changes smoothly and having high accuracy can be synthesized without requiring the mixing of pixel values.

Moreover, the conversion of product shape data into a polygon mesh can be performed by dividing the product shape data into a plurality of patches, generating grid points using predetermined division lines in the parameter space or the free-form surface of each patch and generating a point sequence at predetermined intervals on the boundary line of the patch, forming a three-dimensional polygon mesh having respective apexes on the free-form surface using the grid points on the inside of the boundary line and the point sequence on the boundary line, and integrating the polygon meshes of all the patches into one polygon mesh.

After the respective polygon meshes are formed for a plurality of patches W obtained by dividing the surface shape data, the polygon meshes of all the patches are integrated into one polygon mesh Qc, whereby the entire surface shape data can be converted easily into a polygon mesh by repeating a small amount of calculation processing for each patch.

The division lines for generating the above-mentioned grid points and the point sequence on the boundary line are respectively arranged so as to have uniform intervals in the predetermined ranges; and the for the of the three-dimensional polygon mesh is performed by connecting the grid points inside the boundary line to form a grid mesh, converting the grid mesh into triangular polygons, and connecting the grid points on the outer circumference of the grid mesh to the point sequence on the boundary line to form triangular polygons. Hence, the projection onto the two-dimensional plane of the three-dimensional polygon mesh and the process for restoring the triangular polygons to the three-dimensional polygon mesh are not performed, whereby the burden of calculation is scarce and the processing time is shortened. Furthermore, distortion associated with the two-dimensionalization and three-dimensionalization processes does nor occur.

Moreover, the point sequence on the boundary line is shared between the adjacent patches as having the same position, whereby the respective patches are connected without discontinuity and the integration into one polygon mesh is made easily.

With respect to the process in the grain generating section 34, the displacement amount by which each apex of the polygon mesh is displaced is set by multiplying the basic displacement amount based on the texture by the displacement amount reduction ratio corresponding to the draft of the metal mold. Hence, no undercut occurs at the time of mold removal, whereby the depth of the grain is changed smoothly and a grain shape hawing a good-looking external, surface is obtained.

In the case of performing texture synthesis in the patch unit mode, this is advantageous in that the characteristics of the grain indicated by the texture data input to the data input section 11 can be maintained faithfully and in that the calculation time required for the process is not required to be long, as described above. However, in the case that the grain texture has geometric patterns, such as squares and circles formed of straight lines and curves, it is conceivable that deviations remain even if the mixing of pixel values is performed. On the other hand, in this embodiment, the pixel unit mode is also selectable, whereby textures having no discontinuous portions, such as deviations, can be synthesized in the pixel unit mode, although a slightly longer processing time is required depending on the target level.

The size of the patch W of the surface shape should only be determined arbitrarily depending on the processing capability of the computer of the device for forming surface processing data 10.

In this embodiment, an example has been described in which a triangular mesh is generated in each patch unit defined by patch information input to the data input section 11; however, in the case that the size of the surface shape data is small and corresponds to one patch, it is not required to be divided into a plurality of patches as a matter of course, whereby conversion into an integrated polygon mesh at step 102 shown in FIG. 2 becomes necessary.

In this embodiment, an example has been described in which the B-spline curve is used as the free curve of the boundary line; however, the present invention is similarly applicable to other free curves.

Figure 21C:
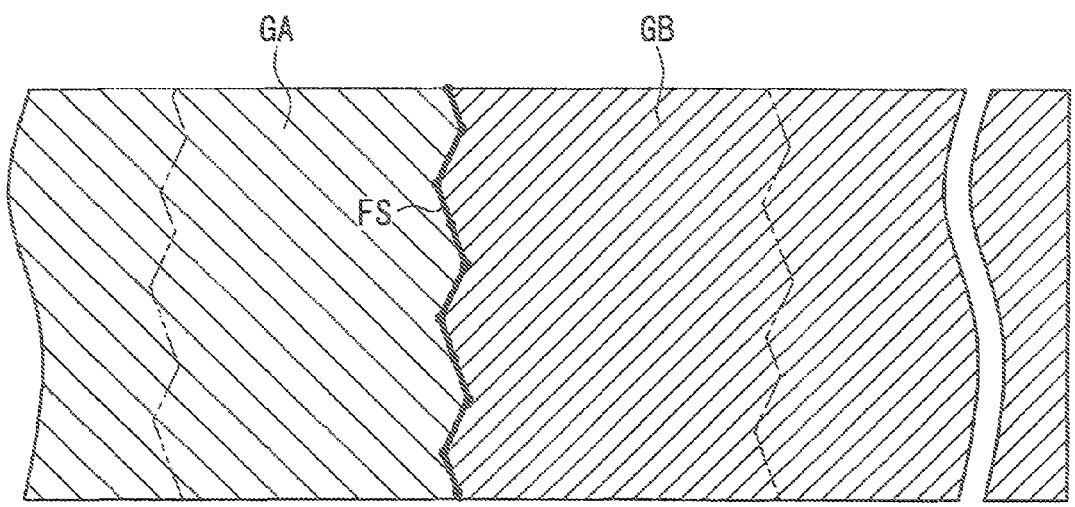
FIG. 21C is an explanatory view showing a procedure of searching for the "optimal boundary line"

Furthermore, in this embodiment, in the texture synthesis in the patch unit mode at the connection portions of the regions obtained by dividing the integrated polygon mesh QT, the pixel values of the textures GA and GB are mixed on both sides in which the optimal boundary line FS is used as the center at step 311; however, in the case that sufficiently smooth connection is obtained by simply connecting the textures GA and GB on the optimal boundary line FS depending on the characteristics of the texture and the fineness of the polygon mesh, as shown in FIG. 21C, the process for mixing the pixel values can be omitted.

It is assumed that the texture data is provided by gray scale image data of 256 gradations; however, without being limited to this, it may be possible to use image data in which grain depth information is provided for the density of a plurality of color components.

The direction in which the respective apexes pc of the polygon mesh QT are displaced on the basis of the texture data of the grain is set to the normal direction; however, the direction can be set to an arbitrary direction.

In the grain pattern displacement mapping, with respect to the displacement amount reduction ratio corresponding to the draft, the reduction ratio is assumed to be changed continuously; however, it is possible that the reduction ratio is intentionally changed stepwise at arbitrary steps as a matter of course.

Furthermore, the change formula for determining the displacement amount reduction ratio is selected at the start time of processing together with the input of the surface shape data and the texture data; however, the displacement mapping process may be started after the displacement mapping stage was reached, a message for prompting selection was displayed on the monitor 23, and selection operation being waited for has been performed.

Although the present invention has been described in detail with reference to a specific embodiment thereof, it is obvious to those skilled in the art that various changes and modifications can be made without departing from the spirit and scope of the invention.

The present application is based on Japanese Patent Application (No. 2010-052123) filed on Mar. 2, 2010, the contents of which are incorporated herein by reference.

INDUSTRIAL APPLICABILITY

The present invention has significant effects when used in the field of producing various resin products, on the surfaces of which grain patterns are formed.

DESCRIPTION OF REFERENCE NUMERALS

10 device for forming surface processing data
11 data input section 12 input data storage section
13 data processing section
19 polygon data storage section
20 data output section
22 operation input section
23 monitor
30 polygon mesh forming section
31 polygon mesh integrating section
32 polygon mesh region dividing section
33 texture synthesizing section
34 grain generating section
35 working memory
A initial region
b interval upper-limit value
B adjacent region
Ca1, Ca2, Ca3, Ca4 grid points
Cb point sequence
Cb1, Cb2, Cb3, Cb4 points
D overlapped region
F0, F1, F2, F3, F4 boundary lines
GA, GB textures
H rectangular region
J free-form surface
K, K1, K2 boundary lines
M search region
N predetermined region
PP, PT templates
pc apex
Qc triangular polygon mesh
QT integrated polygon mesh
R0 straight line for connection
R1, R2 edge lines
Sqc square grid mesh
Tpc triangular polygon
W, W1, W2 patches
X region being processed
Δ1, Δ2 triangles

The invention claimed is:

1. A method for forming surface processing data comprising:
converting product shape data of an object to which a grain defined by a free-form surface is given into a polygon mesh;
dividing the polygon mesh into regions;
setting one of the divided regions as an initial region, and mapping a texture based on texture data in the initial region;
synthesizing a new texture being connected to the mapped texture with a change satisfying a predetermined request level from the texture data;
mapping the new texture repeatedly in regions adjacent to the region in which the texture data is synthesized and having no texture value, thereby mapping the texture in all the regions of the polygon mesh;
displacing the respective apexes of the polygon mesh in the respective normal directions on the basis of the texture mapped to the polygon mesh;
forming new polygon mesh data on the basis of the respective displaced apexes; and
using the new polygon mesh data as surface processing data to which the grain is given, wherein
a displacement amount by which each apex of the polygon mesh is displaced is obtained by multiplying a basic displacement amount based on the texture by a displacement amount reduction ratio corresponding to a draft of a metal mold.

2. The method for forming surface processing data according to claim 1, wherein:
the synthesis of the new texture is performed by setting an overlapped region adjacent to an adjacent region in the initial region and performing synthesis in patch unit in the overlapped region; and
texture mapping in all the regions of the polygon mesh is performed by mapping the new texture synthesized in the patch unit in the region, being processed and formed of the overlapped region and the adjacent region, and repeating the synthesis of the new texture by using the mapped region being processed and the initial region as a new initial region.

3. The method for forming surface processing data according to claim 2, wherein
the setting of the overlapped region is performed by:
searching for a boundary line of the other region of the adjacent region as the line for connecting the apexes of the polygon mesh;
expanding and multiplexing the boundary line on the outer side of the adjacent region; and
setting the region in which the multiplexed boundary lines are overlapped with the initial region as the overlapped region.

4. The method for forming surface processing data according to claim 3, further comprising:
allocating an ID to each region to which the polygons belong in the polygons in each divided region; and
performing the search for the boundary line by referring to the ID.

5. The method for forming surface processing data according to claim 3, further comprising
making the boundary line smooth before the multiplication at the setting of the overlapped region.

6. The method for forming surface processing data according to claim 3, wherein
the multiplication of the boundary line is performed by following the apexes in order on the boundary line to obtain the apexes of the other ends of edge lines connected to the respective apexes, sequentially connecting the apexes of the other ends, setting a new boundary line on the outside of the boundary line, and sequentially repeating this process to obtain a plurality of expanded boundary lines.

7. The method for forming surface processing data according to claim 2, wherein
the synthesis of a new texture in the patch unit is performed by:
projecting the region being processed onto a two-dimensional plane;
setting a rectangular region covering the region being processed on the projecting plane;
allocating a new texture to the rectangular region;
searching for an optimal boundary line in which the difference between the texture value of the texture mapped in the initial region and the texture value of the new texture becomes minimal in the overlapped region; and
connecting the new texture to the texture mapped in the initial region using the optimal boundary line.

8. The method for forming surface processing data according to claim 7, wherein
the new texture to be allocated to the rectangular region is obtained by cutting out the texture most similar to the overlapped region of the texture mapped in the initial region from the texture data containing the texture mapped in the initial region.

9. The method for forming surface processing data according to claim 7, wherein
the optimal boundary line is searched for by following one boundary line of the multiplexed boundary lines and by the movement from the current apex to the next apex on the boundary line or to the apex in which the difference in pixel value is minimal among the apexes on the inside boundary line or the outside boundary line being adjacent under the condition that the advance direction is not reversed.

10. The method for forming surface processing data according to claim 9, wherein
the search for the optimal boundary line is performed while excluding a predetermined number of boundary lines at both ends of the overlapped region.

11. The method for forming surface processing data according to claim 2, wherein
the synthesis of a new texture in the patch unit is performed by:
projecting the region being processed onto a two-dimensional plane;
setting a rectangular region covering the region being processed on the projecting plane;
allocating a new texture to the rectangular region;
searching for an optimal boundary line in which the difference between the texture value of the texture mapped in the initial region and the texture value of the new texture becomes minimal in the overlapped region; and
in the predetermined range in which the optimal boundary line is used as the center, weighting the texture value of the texture mapped in the initial region and the texture value of the new texture allocated to the rectangular region depending on the distance from the optimal boundary line and mixing the values.

12. The method for forming surface processing data according to claim 1, wherein:
the synthesis of the new texture is performed by performing synthesis in pixel unit at each apex having no texture value, being located in a region adjacent to the region in which the texture is mapped and being adjacent to the apex having a texture value; and
texture mapping in all the regions of the polygon mesh is performed by mapping the new texture synthesized in the pixel unit at the apexes and repeating the synthesis of the new texture at each apex having no texture value.

13. The method for forming surface processing data according to claim 12, wherein
the synthesis of a new texture in the pixel unit is performed by:
searching for an apex having no pixel value and adjacent to an apex having a pixel value in a region, and setting the apex as an object apex in which the pixel value is determined;
projecting the predetermined region containing the object apex onto a two-dimensional plane;
setting a template containing the object apex and a plurality of apexes adjacent to the object apex and having texture values on the projecting plane;
searching for the position of the template in which the difference between the texture data and the texture value of the template becomes minimal; and
mapping the texture value of the texture data corresponding to the position of the object apex inside the template at the position of the template having been searched for at the object apex.

14. The method for forming surface processing data according to claim 1, wherein:
the synthesis of the new texture is performed in a patch unit mode and a pixel unit mode, the modes being selectable;
in the patch unit mode;
the synthesis is performed by:
setting an overlapped region adjacent to the adjacent region in the initial region and performing synthesis in the patch unit in the overlapped region; and
mapping the new texture synthesized in the patch unit in the region, being processed and formed of the overlapped region and the adjacent region, and repeating the synthesis of the new texture by using the mapped region being processed and the initial region as a new initial region to perform texture mapping in all the regions of the polygon mesh, and
in the pixel unit mode,
the synthesis is performed by:
performing synthesis in the pixel unit at each apex having no texture value, being located in a region adjacent to the region in which the texture is mapped and being adjacent to the apex having a texture value; and
mapping the new texture synthesized in the pixel unit at the apexes and repeating the synthesis of the new texture at each apex having no texture value to perform texture mapping in all the regions of the polygon mesh.

15. The method for forming surface processing data according to claim 1, wherein
the conversion of the product shape data into a polygon mesh is performed by:
dividing the product shape data into a plurality of patches;
generating grid points using predetermined division lines in a parameter space of the free-form surface of each patch and generating a point sequence at predetermined intervals on the boundary line of the patch;
forming a three-dimensional polygon mesh having respective apexes on the free-form surface using the grid points inside the boundary line and the point sequence on the boundary line; and
integrating the polygon meshes of all the patches into one polygon mesh.

16. The method for forming surface processing data according to claim 15, wherein:
the division lines for generating the grid points and the point sequence on the boundary line are set so as to have uniform intervals in the respective predetermined ranges; and
the formation of the three-dimensional polygon mesh is performed by:
connecting the grid points inside the boundary line to form a grid mesh;
converting the grid mesh into triangular polygons; and
connecting the grid points on the outer circumference of the grid mesh to the point sequence on the boundary line to form triangular polygons.

17. The method for forming surface processing data according to claim 15, wherein
the point sequence of the patch on the boundary line is shared between the adjacent patches as having the same position.

18. The method for forming surface processing data according to claim 1, wherein
the division of the polygon mesh into regions is performed by dividing the polygon mesh in a predetermined angle range calculated using a predetermined reference axis and the normal direction of the polygon mesh.

19. The method for forming surface processing data according to claim 1, wherein in the polygons in each divided region, an ID is allocated to each region to which the polygons belong.

20. The method for forming surface processing data according to claim 1, wherein
the basic displacement amount of the apex of the polygon mesh is obtained by multiplying the texture value corresponding to the apex of the texture by a predetermined conversion rate.

21. The method for forming surface processing data according to claim 1, wherein
the texture data is image data in which the pixel value obtained by allocating the depth of a grain with respect to two-dimensional positional coordinates to density gradation is used as a texture value.

* * * * *